US012520261B2

(12) United States Patent
Abedini et al.

(10) Patent No.: US 12,520,261 B2
(45) Date of Patent: *Jan. 6, 2026

(54) TIMING OFFSET TECHNIQUES IN WIRELESS COMMUNICATIONS

(71) Applicant: QUALCOMM Incorporated, San Diego, CA (US)

(72) Inventors: Navid Abedini, Basking Ridge, NJ (US); Muhammad Nazmul Islam, Littleton, MA (US); Jianghong Luo, Skillman, NJ (US); Wanshi Chen, San Diego, CA (US); Tao Luo, San Diego, CA (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/369,663

(22) Filed: Jul. 7, 2021

(65) Prior Publication Data

US 2021/0337499 A1   Oct. 28, 2021

Related U.S. Application Data

(62) Division of application No. 16/450,325, filed on Jun. 24, 2019, now Pat. No. 11,082,941.

(Continued)

(51) Int. Cl.
*H04W 56/00* (2009.01)
*H04W 74/0833* (2024.01)

(52) U.S. Cl.
CPC ... *H04W 56/0045* (2013.01); *H04W 56/0005* (2013.01); *H04W 56/001* (2013.01); *H04W 74/0833* (2013.01)

(58) Field of Classification Search
CPC ......... H04W 56/0045; H04W 56/0005; H04W 56/001; H04W 74/0833; H04W 56/002; H04W 56/0025; H04W 84/047
See application file for complete search history.

(56) References Cited

U.S. PATENT DOCUMENTS 8,855,044 B2 * 10/2014 Liao ................. H04W 56/0045
                                                    370/324
8,976,780 B2 *  3/2015 Cai ....................... H04W 72/23
                                                    370/312

(Continued)

FOREIGN PATENT DOCUMENTS

CN      104125187 A     10/2014
CN      105704807 A      6/2016
(Continued)

OTHER PUBLICATIONS

International Preliminary Report on Patentability—PCT/US2019/039045, The International Bureau of WIPO—Geneva, Switzerland, Feb. 18, 2021.

(Continued)

*Primary Examiner* — Chuong M Nguyen
(74) *Attorney, Agent, or Firm* — Holland & Hart LLP

(57) ABSTRACT

Methods, systems, and devices for wireless communications are described that provide for multiple timing advance offsets that may be used in communications between wireless devices on a wireless communications system. A first timing advance offset may be a fixed offset that has a predetermined value or is selected from a set of available predetermined values, and a second timing advance offset may be adjustable by a wireless device. The second timing advance offset may be used in cases where relatively large distances between wireless devices are present in a system, where certain fixed timing advances are used in addition to or irrespective of a receiving devices propagation delay, (Continued)

where one or more parent nodes have an associated timing reference, or combinations thereof.

30 Claims, 15 Drawing Sheets

Related U.S. Application Data

(60) Provisional application No. 62/716,486, filed on Aug. 9, 2018.

(56) References Cited

U.S. PATENT DOCUMENTS

| | | | |
|---|---|---|---|
| 9,929,834 B2 | 3/2018 | Chen et al. | |
| 10,270,516 B2* | 4/2019 | Guo | H04B 7/155 |
| 11,082,941 B2* | 8/2021 | Abedini | H04W 56/0005 |
| 2011/0080896 A1* | 4/2011 | Krishnamurthy | H04W 72/20 |
| | | | 370/336 |
| 2012/0314591 A1* | 12/2012 | Zhang | H04L 27/266 |
| | | | 370/252 |
| 2014/0016620 A1* | 1/2014 | Singh | H04L 5/0032 |
| | | | 370/336 |
| 2017/0079035 A1* | 3/2017 | Seo | H04W 72/0453 |
| 2017/0201958 A1* | 7/2017 | He | H04W 72/21 |
| 2017/0302359 A1* | 10/2017 | Guo | H04W 92/12 |
| 2018/0167904 A1 | 6/2018 | Lee et al. | |
| 2018/0242311 A1* | 8/2018 | Maeda | H04W 52/143 |
| 2018/0352527 A1* | 12/2018 | Wang | H04W 56/0045 |
| 2019/0037514 A1* | 1/2019 | Seo | H04L 5/1469 |
| 2019/0053228 A1* | 2/2019 | Akkarakaran | H04W 72/0446 |
| 2019/0150141 A1* | 5/2019 | Irukulapati | H04L 5/14 |
| | | | 370/280 |
| 2020/0053682 A1 | 2/2020 | Abedini et al. | |

FOREIGN PATENT DOCUMENTS

| | | | | |
|---|---|---|---|---|
| CN | 107113871 A | 8/2017 | | |
| CN | 108012329 A | 5/2018 | | |
| EP | 1261227 A1 | 11/2002 | | |
| EP | 3046377 A1 | 7/2016 | | |
| KR | 20110119691 A | 11/2011 | | |
| WO | WO-2010095851 A2 * | 8/2010 | | H04B 7/155 |
| WO | WO2016106676 A1 | 7/2016 | | |
| WO | WO-2016175981 A1 | 11/2016 | | |
| WO | WO-2019062779 A1 | 4/2019 | | |
| WO | WO2019096298 A1 | 5/2019 | | |

OTHER PUBLICATIONS

International Search Report and Written Opinion—PCT/US2019/039045—ISA/EPO—Sep. 27, 2019.

Thales, et al., "NR-NTN: TP for Chap 7.3 NR Modifications to Support NTN", 3GPP Draft; 3GPP TSG RAN Meeting #80, RP-181394_CHAP 7.3REV, 3rd Generation Partnership Project (3GPP), Mobile Competence Centre; 650, Route Des Lucioles; F-06921 Sophia-Antipolis Cedex; France, vol. TSG RAN, No. La Jolla, USA; Jun. 11, 2018-Jun. 14, 2018, Jun. 14, 2018 (Jun. 14, 2018), XP051512027, 34 Pages, Retrieved from the Internet: URL: http://www.3gpp.org/ftp/tsg%5Fran/TSG%5FRAN/TSGR%5F80/Docs/RP%2D181394%2Ezip [retrieved on Jun. 14, 2018], Section 7.3.2.2.2, pp. 1-11, pp. 21-24.

Thales, et al., "NR-NTN: TP for Chap 7.3 NR Modifications to Support NTN", 3GPP TSG RAN Meeting #80, RP-181394, revision from RP-181380, La Jolla, USA, Jun. 11, 2018-Jun. 14, 2018, 37 Pages, Jun. 14, 2018.

* cited by examiner

ANF 205

UEF 210

TIMING OFFSET TECHNIQUES IN WIRELESS COMMUNICATIONS

CROSS REFERENCES

The present Application for Patent is a Divisional of U.S. patent application Ser. No. 16/450,325 by Abedini et al., entitled, "TIMING OFFSET TECHNIQUES IN WIRELESS COMMUNICATIONS" filed Jun. 24, 2019, which claims priority to U.S. Patent Application No. 62/716,486 by Abedini et al., entitled "TIMING OFFSET TECHNIQUES IN WIRELESS COMMUNICATIONS," filed Aug. 9, 2018, assigned to the assignee hereof and incorporated by reference herein.

BACKGROUND

The following relates generally to wireless communications, and more specifically to timing offset techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may include access nodes to facilitate wireless communication between user equipment and a network. For example, an LTE or NR base station may provide a mobile device access to the internet via the wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impracticable to connect each access node to the network via a wired connection, and certain networks or portions thereof may be configured as integrated access and backhaul (IAB) networks where one or more access nodes have wireless backhaul connections to the network. Efficient deployment and operation of such access nodes with wireless backhaul connections may be desirable to enable faster deployment of such networks and enhance end user coverage.

SUMMARY

The described techniques relate to improved methods, systems, devices, and apparatuses that support timing offset techniques in wireless communications. Generally, the described techniques provide for multiple timing advance offsets that may be used in communications between wireless devices on a wireless communications system. In some cases, a first timing advance offset is a fixed offset that has a predetermined value or is selected from a set of available predetermined values, and a second timing advance offset may be adjustable by a wireless device. The second timing advance offset may be used in cases, for example, where relatively large distances between wireless devices are present in a system, where certain fixed timing advances are used in addition to or irrespective of a receiving devices propagation delay, where one or more parent nodes have an associated timing reference, or combinations thereof.

A method of wireless communication is described. The method may include identifying, at a first wireless device a first timing advance offset for communications with a second wireless device, where the first timing advance offset is a fixed offset that is based on a frequency range and a duplexing configuration for communications between the first wireless device and the second wireless device, determining a second timing advance offset, the second timing advance offset being adjustable, and communicating based on the first timing advance offset and the second timing advance offset.

An apparatus for wireless communication is described. The apparatus may include a processor, memory in electronic communication with the processor, and instructions stored in the memory. The instructions may be executable by the processor to cause the apparatus to identify, at a first wireless device a first timing advance offset for communications with a second wireless device, where the first timing advance offset is a fixed offset that is based on a frequency range and a duplexing configuration for communications between the first wireless device and the second wireless device, determine a second timing advance offset, the second timing advance offset being adjustable, and communicate based on the first timing advance offset and the second timing advance offset.

Another apparatus for wireless communication is described. The apparatus may include means for identifying, at a first wireless device a first timing advance offset for communications with a second wireless device, where the first timing advance offset is a fixed offset that is based on a frequency range and a duplexing configuration for communications between the first wireless device and the second wireless device, determining a second timing advance offset, the second timing advance offset being adjustable, and communicating based on the first timing advance offset and the second timing advance offset.

A non-transitory computer-readable medium storing code for wireless communication is described. The code may include instructions executable by a processor to identify, at a first wireless device a first timing advance offset for communications with a second wireless device, where the first timing advance offset is a fixed offset that is based on a frequency range and a duplexing configuration for communications between the first wireless device and the second wireless device, determine a second timing advance offset, the second timing advance offset being adjustable, and communicate based on the first timing advance offset and the second timing advance offset.

In some examples of the method, apparatuses, and non-transitory computer-readable medium described herein, the communicating may include operations, features, means, or instructions for communicating with the second wireless device by receiving a timing advance command from the second wireless device responsive to the RACH transmission, the timing advance command including a timing advance value that may be based on a propagation delay for transmissions between the first wireless device and the second wireless device and transmitting a shared channel transmission to the second wireless device based on the first timing advance offset, the second timing advance offset, and the timing advance value.

In some examples of the method, apparatuses, and non-transitory computer-readable medium described herein, the determining the second timing advance offset includes receiving the second timing advance value from the second wireless device or from a different wireless device. In some examples of the method, apparatuses, and non-transitory computer-readable medium described herein, the determining the second timing advance offset may include operations, features, means, or instructions for receiving a second value for the second timing advance offset and determining, based on a priority order, which of the first value or the second value may be to be used for the communication with the second wireless device. In some examples of the method, apparatuses, and non-transitory computer-readable medium described herein, the priority order may be based on one or more of a type of signaling used to indicate the first value and the second value, or a time order of receiving the first value and the second value.

In some examples of the method, apparatuses, and non-transitory computer-readable medium described herein, the type of signaling used to indicate the first value and the second value includes unicast signaling, multicast signaling, or broadcast signaling, and where second timing offset values received via unicast signaling may have priority over values received via multicast signaling or broadcast signaling, and where second timing offset values received via multicast signaling may have priority over values received via broadcast signaling. In some examples of the method, apparatuses, and non-transitory computer-readable medium described herein, the type of signaling used to indicate the first value and the second value includes medium access control (MAC) signaling, RRC signaling, backhaul signaling, group common PDCCH signaling, remaining minimum system information (RMSI) signaling, or other system information (OSI) signaling.

In some examples of the method, apparatuses, and non-transitory computer-readable medium described herein, the second wireless device and the first wireless device may be nodes in an integrated access and backhaul (IAB) network, and where the second timing advance offset may be based on distance between relay nodes in the IAB network. In some examples of the method, apparatuses, and non-transitory computer-readable medium described herein, the second timing advance offset may be a cell-specific value associated with the second wireless device. In some examples of the method, apparatuses, and non-transitory computer-readable medium described herein, the second timing advance offset may be a network-wide value that applies to multiple nodes across a wireless network.

In some examples of the method, apparatuses, and non-transitory computer-readable medium described herein, the second timing advance offset may be applied to uplink transmissions from the first wireless device to the second wireless device irrespective of a propagation delay of transmissions between the first wireless device and the second wireless device.

In some examples of the method, apparatuses, and non-transitory computer-readable medium described herein, the second wireless device may be a relay node in an integrated access and backhaul (IAB) network, and where the second timing advance offset indicates a timing difference between receive timing and transmission timing at the relay node. In some examples of the method, apparatuses, and non-transitory computer-readable medium described herein, the second timing advance offset may be UE specific, cell-specific, specific to a group of UEs, or specific to a directional transmission beam of the base station.

In some examples of the method, apparatuses, and non-transitory computer-readable medium described herein, the second wireless device may be a relay node in an integrated access and backhaul (IAB) network, and where the second timing advance offset may be based on a timing advance between the relay node and a parent node in the IAB network.

Some examples of the method, apparatuses, and non-transitory computer-readable medium described herein may further include operations, features, means, or instructions for receiving an updated second timing advance offset from the second wireless device, where the updated second timing advance may be based on a change in the timing advance between the relay node and the parent node in the IAB network.

A method of wireless communication at a second wireless device is described. The method may include determining a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicating based on the first timing advance offset and the second timing advance offset.

An apparatus for wireless communication at a second wireless device is described. The apparatus may include a processor, memory in electronic communication with the processor, and instructions stored in the memory. The instructions may be executable by the processor to cause the apparatus to determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicate based on the first timing advance offset and the second timing advance offset.

Another apparatus for wireless communication at a second wireless device is described. The apparatus may include means for determining a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicating based on the first timing advance offset and the second timing advance offset.

A non-transitory computer-readable medium storing code for wireless communication at a second wireless device is described. The code may include instructions executable by a processor to determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicate based on the first timing advance offset and the second timing advance offset.

Some examples of the method, apparatuses, and non-transitory computer-readable medium described herein may further include operations, features, means, or instructions for transmitting the second timing advance offset to the first wireless device.

In some examples of the method, apparatuses, and non-transitory computer-readable medium described herein, communicating may include operations, features, means, or instructions for determining a timing advance value for the first wireless device, the timing advance value based on a propagation delay for transmissions between the first wireless device and the second wireless device, transmitting a timing advance command to the first wireless device responsive to determining the timing advance value, the timing advance command including the timing advance value and receiving a shared channel transmission from the first wireless device that may be based on the first timing advance offset, the second timing advance offset, and the timing advance value. Some examples of the method, apparatuses, and non-transitory computer-readable medium described herein may further include operations, features, means, or instructions for determining a second value for the second timing advance offset, and where a priority order indicates which of the first value or the second value may be to be used for the uplink transmission. In some examples of the method, apparatuses, and non-transitory computer-readable medium described herein, the priority order may be based on one or more of a type of signaling used to indicate the first value and the second value, or a time order of receiving the first value and the second value.

In some examples of the method, apparatuses, and non-transitory computer-readable medium described herein, the type of signaling used to indicate the first value and the second value includes unicast signaling, multicast signaling, or broadcast signaling, and where second timing offset values received via unicast signaling may have priority over values received via multicast signaling or broadcast signaling, and where second timing offset values received via multicast signaling may have priority over values received via broadcast signaling. In some examples of the method, apparatuses, and non-transitory computer-readable medium described herein, the type of signaling used to indicate the first value and the second value includes medium access control (MAC) signaling, RRC signaling, backhaul signaling, group common PDCCH signaling, remaining minimum system information (RMSI) signaling, or other system information (OSI) signaling.

In some examples of the method, apparatuses, and non-transitory computer-readable medium described herein, the second wireless device and the first wireless device may be nodes in an integrated access and backhaul (IAB) network, and where the second timing advance offset may be based on distance between relay nodes in the IAB network. In some examples of the method, apparatuses, and non-transitory computer-readable medium described herein, the second timing advance offset may be a cell-specific value associated with the second wireless device. In some examples of the method, apparatuses, and non-transitory computer-readable medium described herein, the second timing advance offset may be a network-wide value that applies to multiple nodes across a wireless network.

In some examples of the method, apparatuses, and non-transitory computer-readable medium described herein, the second timing advance offset may be applied to communications with the first wireless device irrespective of a propagation delay of transmissions between the first wireless device and the second wireless device.

In some examples of the method, apparatuses, and non-transitory computer-readable medium described herein, the second wireless device may be a relay node in an integrated access and backhaul (IAB) network, and where the second timing advance offset indicates a timing difference between receive timing and transmission timing at the relay node. In some examples of the method, apparatuses, and non-transitory computer-readable medium described herein, the second timing advance offset may be UE specific, cell-specific, specific to a group of UEs, or specific to a directional transmission beam of the base station.

In some examples of the method, apparatuses, and non-transitory computer-readable medium described herein, the second wireless device may be a relay node in an integrated access and backhaul (IAB) network, and where the second timing advance offset may be based on a timing advance between the second wireless device and a parent node in the IAB network. Some examples of the method, apparatuses, and non-transitory computer-readable medium described herein may further include operations, features, means, or instructions for receiving a change in the timing advance from the parent node and transmitting an updated second timing advance offset to the first wireless device responsive to the change in the timing advance received from the parent node.

DETAILED DESCRIPTION

According to some aspects of the disclosure, wireless backhaul links may be used to couple an access node (AN) to a network in place of high-capacity, wired backhaul link (e.g., fiber). An AN may be a base station in a wireless communications system, for example, although other network devices may serve as an AN (e.g., a user equipment (UE) in a peer-to-peer or device-to-device communication system may serve as an AN), and an AN may be referred to generally as a wireless device herein. In some systems, a first wireless device may establish a wireless backhaul link to a second wireless device which may have a high-capacity, wired backhaul link. In this manner, the first wireless device may communicate access traffic to the network via the second wireless device through the combination of the wireless backhaul link and the wired backhaul link (e.g., a multi-hop link). In some examples, an integrated access and backhaul (IAB) network may use multiple wireless backhaul links before reaching a wired backhaul link, in which the wireless backhaul links share resources with wireless access links. The IAB network may also provide robustness via topological redundancy. In such networks, backhaul resources may be allocated to different wireless communication links between different wireless devices (e.g., ANs or base stations).

In order to have synchronized communications between a first wireless device and a second wireless device (e.g., between a UE and a base station), the first wireless device may employ a timing advance (TA) that accounts for propagation delay between the devices, such that the second wireless device receives the associated transmission at a determined time such as a frame or subframe boundary. Techniques are described herein that provide for multiple offsets that may be applied to TA values. In some cases, a first timing advance offset is a fixed offset that has a predetermined value or is selected from a set of available predetermined values, and which may account for switching delays at a wireless device. A second timing advance offset may be adjustable by a wireless device, and may be used to account for cases where relatively large distances between wireless devices are present in a system, where certain fixed timing advances are used in addition to or irrespective of a receiving devices propagation delay, where one or more parent nodes have an associated timing reference, or combinations thereof.

Aspects of the disclosure are initially described in the context of a wireless communications system. Examples of an IAB system and device timings are then described. Aspects of the disclosure are further illustrated by and described with reference to apparatus diagrams, system diagrams, and flowcharts that relate to timing offset techniques in wireless communications.

Figure 1:
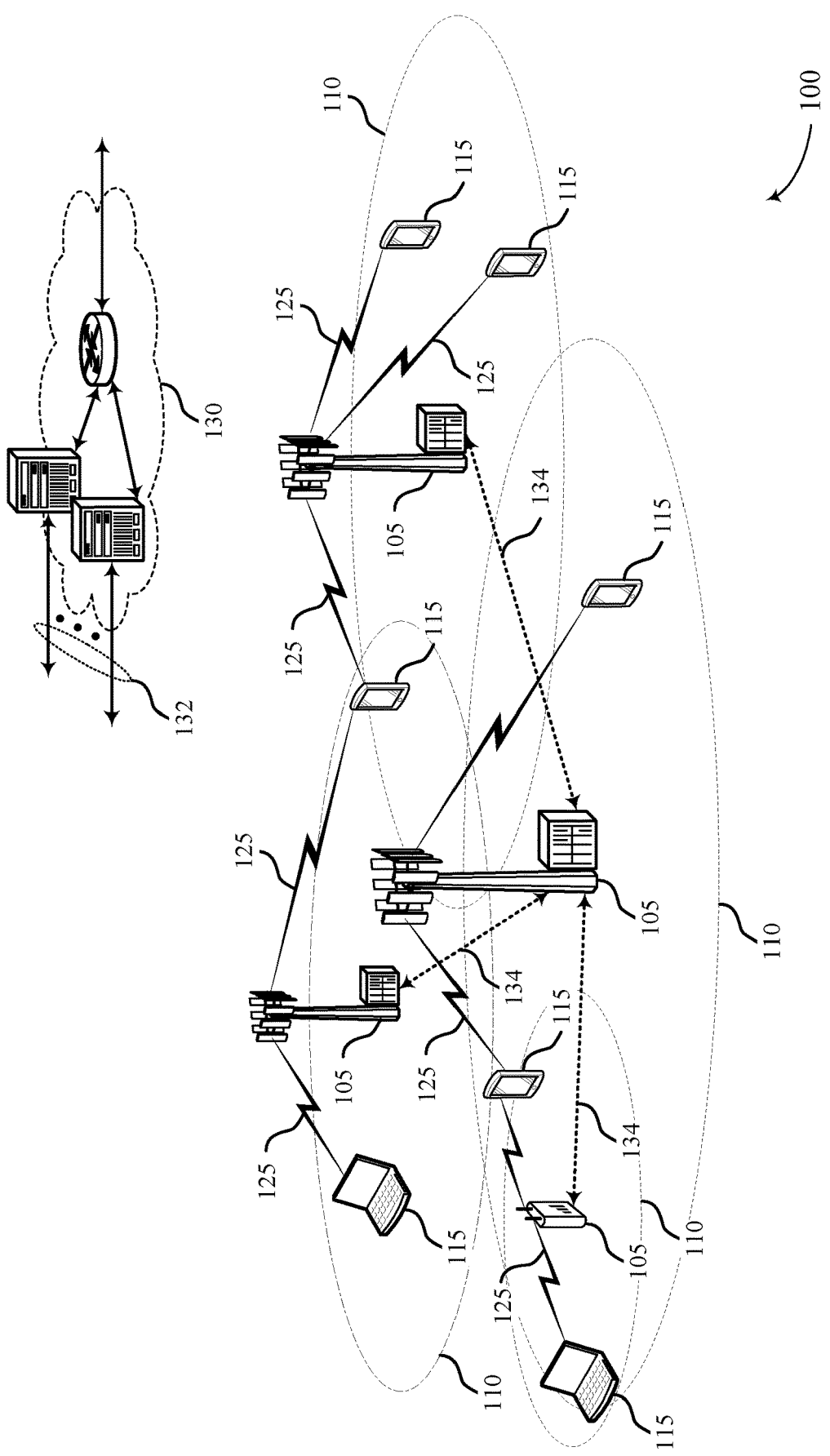
FIG. 1 illustrates an example of a system for wireless communications in accordance with aspects of the present disclosure.

FIG. 1 illustrates an example of a wireless communications system 100 in accordance with aspects of the present disclosure. The wireless communications system 100 includes base stations or access nodes 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 may use wireless backhaul links in an IAB network, and may include a UE function (UEF) in which the device performs as a UE 115 relative to another base station 105, and an access node function (ANF) in which the device performs as a base station 105 to other devices (e.g., one or more UEs 115 or other base stations 105).

Base stations 105 may wirelessly communicate with UEs 115 (or other base stations 105) via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

As indicated above, in order to have synchronized communications between a first base station 105 and a UE 115 or another base station 105, the UE 115 or other base station 105 may employ a TA that accounts for propagation delay between the devices, such that the first base station 105 (which may be a second wireless device as discussed in various examples herein) receives the associated transmission at a determined time such as a frame or subframe boundary. Techniques are described herein that provide for multiple offsets that may be applied to TA values. In some cases, a first timing advance offset is a fixed offset that has a predetermined value or is selected from a set of available predetermined values, and which may account for switching delays at a wireless device. A second timing advance offset may be adjustable by a wireless device, and may be used to account for cases where relatively large distances between wireless devices are present in a system (e.g., when wireless backhaul links between base stations 105 span relatively large distances), where certain fixed timing advances are used in addition to or irrespective of a receiving devices propagation delay (e.g., for multi-hop links), where one or more parent nodes have an associated timing reference, or combinations thereof.

Figure 2:
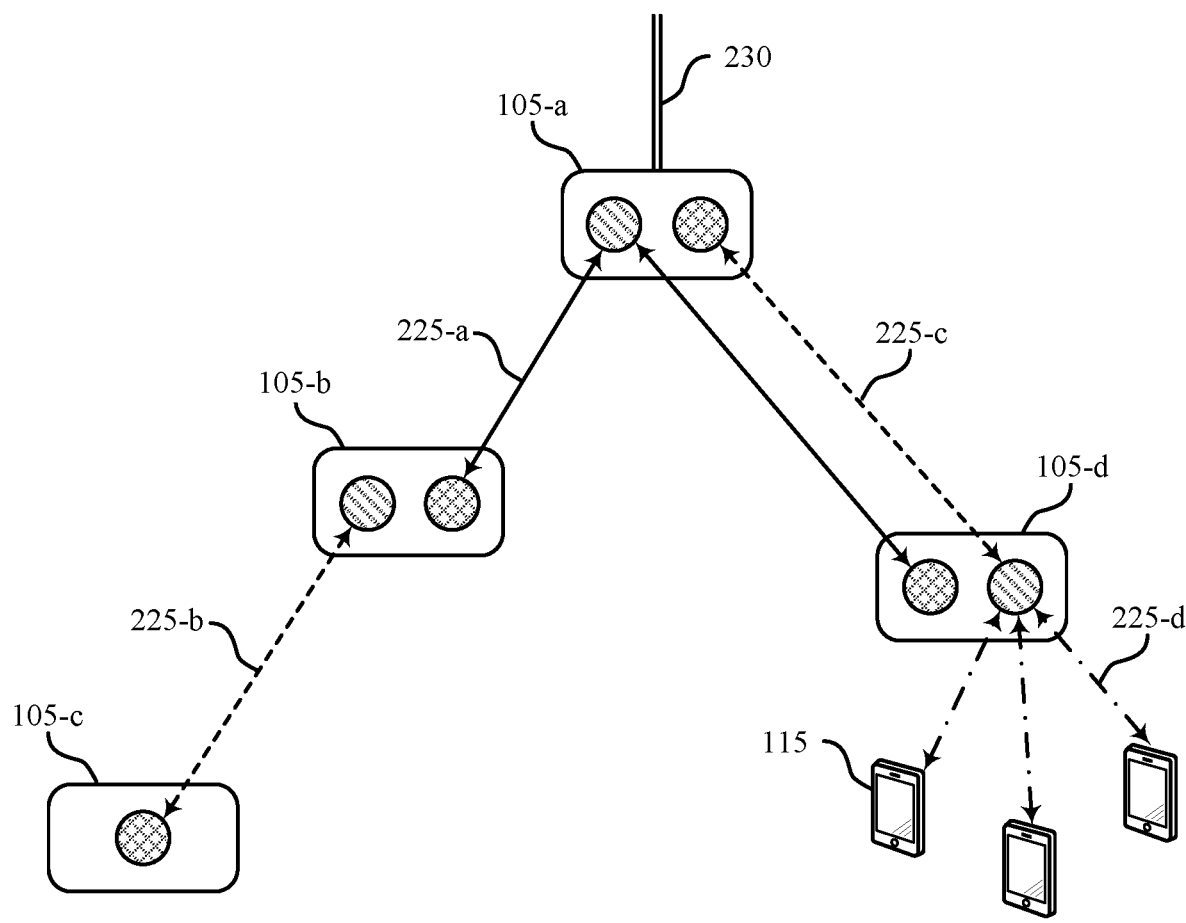
FIG. 2 illustrates an example of an integrated access and backhaul network in accordance with aspects of the present disclosure.
Figure 2:
Figure 2:

FIG. 2 illustrates an example of an integrated access and backhaul (IAB) network 200 in accordance with aspects of the present disclosure. In some examples, IAB network 200 may implement aspects of wireless communication system 100. The IAB network 200 may include a number of access nodes 105 that communicate over a number of different communication links 225, where the communication links 225 may be associated with a same or different set of wireless resources. The access nodes 105 may be examples of the base stations 105 described in reference to FIG. 1. The IAB network 200 may support the use of one or more node functions to enable efficient resource allocation for wireless backhaul communications. In such cases, the access nodes 105 may instantiate one or more node functions to coordinate signaling and resource allocation. That is, the access nodes 105 may instantiate one or more ANFs 205, one or more UEFs 210, or any combination thereof.

For example, access node 105-*a* may be located at a central point of a star, and may be coupled with a wireline backhaul link 230 (i.e., an optical fiber cable). In some cases, access node 105-*a* may be the only access node 105 in IAB network 200 that is coupled with the wireline backhaul link 230. Access node 105-*a* may instantiate an ANF 205, and the access nodes 105 at the leaves of the star (access node 105-*b* and access node 105-*c*) may each instantiate a UEF 210. Access node 105-*a* may then communicate with access node 105-*b* and access node 105-*c* using communication link 225-*a* according to an active mode or a suspended mode using the node functions. In some cases, communication link 225-*a* may be associated with a first set of wireless resources. UEFs 210 may be examples of a first wireless device in accordance with various examples discussed herein, and ANFs 205 may be examples of a second wireless device in accordance with various examples discussed herein.

The ANF 205 and the UEFs 210 may be assigned the same functionalities and signaling protocols for resource allocation as defined by a radio access technology (RAT) such as LTE or NR RATs. That is, resource coordination of a backhaul star can be managed via the RAT, such as a NR RAT and managed via radio resource control (RRC) signaling, for example. Furthermore, wireless resource use among access nodes 105 within a star may be coordinated via a large-scale (e.g., network-wide) schedule. Within each star, signaling and resource management may be regulated by the RAT and a resource sub-schedule may be generated by a star's ANF 205 (such as the ANF 205 instantiated at access node 105-*a*).

In some examples, access node 105-*b* may instantiate an ANF 205 in addition to the UEF 210. Access node 105-*b* may accordingly communicate with access node 105-*c* using communication link 225-*b* according to an active or a suspended mode using the node functions. In some cases, communication link 225-*b* may be associated with a second set of wireless resources.

In another example, access node 105-*d* may instantiate an ANF 205 and communicate with a UEF 210 at access node 105-*a* over communication link 225-*c*. In some examples, communication link 225-*c* may be associated with the second set of resources. That is, communication link may use the same resources as communication link 225-*b*. Additionally, the ANF 205 at access node 105-*d* may be used for mobile access, where access node 105-*d* may communicate with one or more UEs 115 over communication link 225-*d*. As a result, access node 105-*d* may forward data between the one or more UEs 115 and access node 105-*a*. Accordingly, IAB may be accomplished by including the additional star with access node 105-*d* at the center and the UEs 115 at the leaves of the star.

In order to maintain synchronization between access nodes 105 and UEs 115, TAs may be applied at one or more devices such that propagation delays of transmissions between devices may be accounted for. Examples of TAs, and multiple TA offsets that may be applied in accordance with various techniques provided herein, are discussed with respect to FIGS. 3-15. Because one or more of the devices (e.g., access nodes 105) may utilize multiple TA offsets, the access nodes may maintain synchronization, which may increase signal and communication throughput in a wireless network. Further, because the access nodes 105 implement the multiple TA offsets, devices (e.g., access nodes 105 and UEs 115) may not waste resources (e.g., compute resources such as processing resources) maintaining synchronization or resynchronizing.

Figure 3:
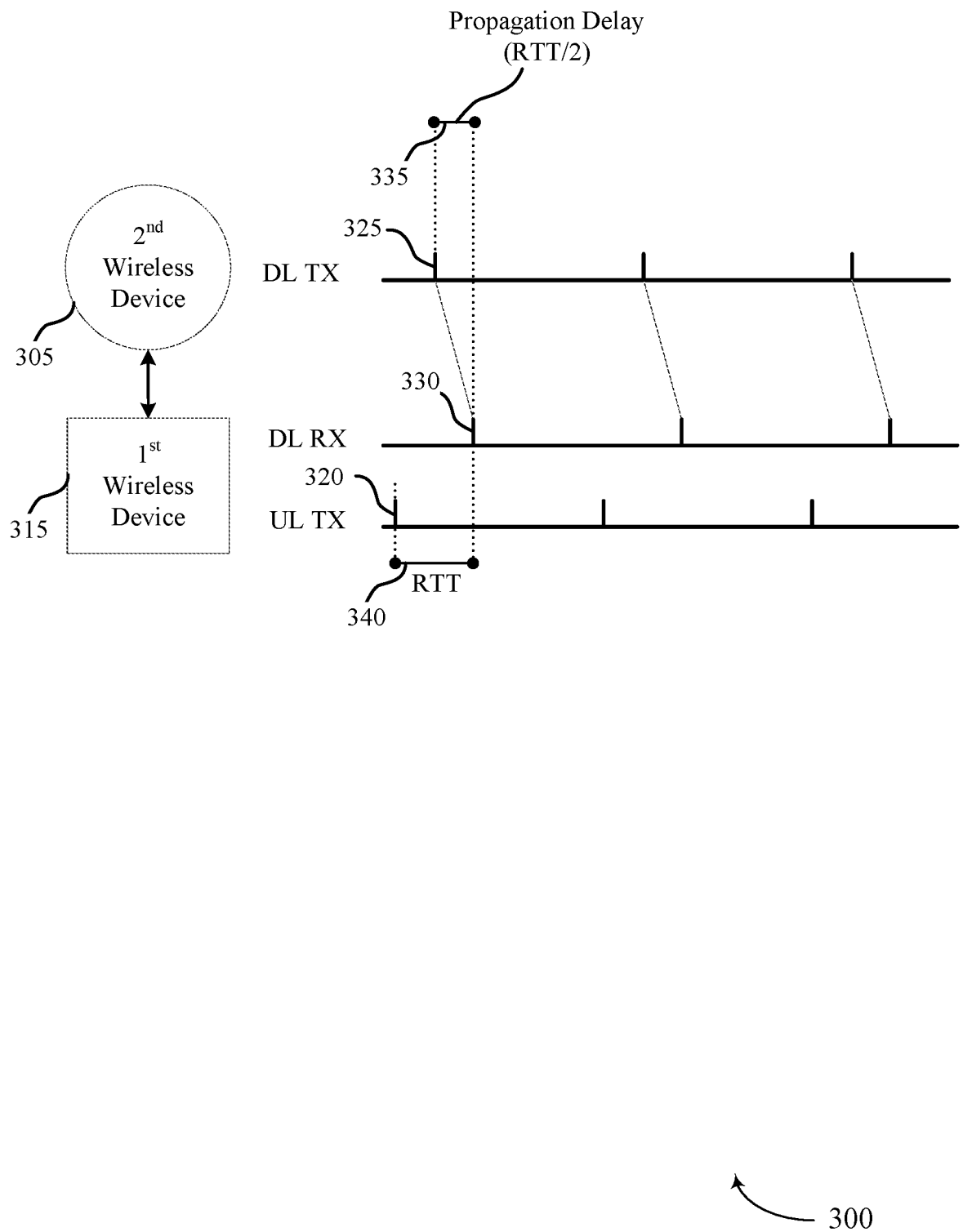
FIG. 3 illustrates an example of a wireless device timing in accordance with aspects of the present disclosure.

FIG. 3 illustrates an example of wireless device timing 300 in accordance with aspects of the present disclosure. In some examples, wireless device timing 300 may implement aspects of wireless communication system 100 or IAB network 200. In this example, a first wireless device 315, which may be an example of a UE 115 or an instantiation of a UEF 210, may transmit an uplink transmission to a second wireless device 305 which may be an example of a base station 105 or an instantiation of an ANF 205. The uplink transmission may be transmitted at a first time 320, which may be timed to arrive at the second wireless device 305 at a second time 325 that is later than the first time 320. Similarly, a downlink transmission may be transmitted from the second wireless device 305 to the first wireless device 315. The downlink transmission may start at second time 325, and the first wireless device may start receiving the downlink transmission at third time 330 that is later than the second time 325 due to propagation delay 335 (i.e., the speed of light times the distance between the devices). A round trip time (RTT) 340 may correspond to the time that it would take for a transmission to go from the first wireless device 315 to the second wireless device 305 and then back to the first wireless device 315.

When establishing an access link between the first wireless device 315 and the second wireless device 305, the second wireless device 305 may estimate the RTT 340 and provide the first wireless device 315 an uplink TA command that includes a TA value. Subsequently, uplink timing for transmissions from the first wireless device 315 to the second wireless device 305 may have a timing that corresponds to the downlink reception timing minus the TA. In such a manner, the second wireless device 305 may receive uplink transmissions and transmit downlink transmissions according to a frame structure, in which uplink transmissions are received starting at subframe boundaries and downlink transmissions are transmitted starting at subframe boundaries, while the first wireless device 315 accounts for propagation delay through the TA. The first wireless device 315 may continue tracking the downlink timing and adjusting the uplink transmission timing to maintain synchronization.

In some established LTE and NR systems, uplink timing adjustments are made according to the equation $(N_{TA}+N_{TAoffset})*T_c$ seconds, where $N_{TA}$ is the TA value and $N_{TAoffset}$ is an offset that is predetermined based on a duplexing mode and frequency range used for wireless transmissions (e.g., $N_{TAoffset}$ is 0 for frequency division duplexing, 25560 for time division duplexing (TDD) in frequencies below 6 GHz, and is 13763 for TDD is frequencies above 6 GHz). The value $T_c$ corresponds to a basic time unit, which may, for example, refer to a sampling period of $T_c=1/30,720,000$ seconds. The TA offset in such cases, which may be a first TA offset as discussed is various examples herein, is thus fixed and not adjustable by the second wireless device 305, and may accommodate required timing for TX/RX switching when devices are operating in TDD mode.

Various aspects of the present disclosure provide techniques that may employ a second timing advance offset that may be adjustable by a wireless device. In such cases, the timing adjustment for uplink transmissions may be made according to $$(N_{TA}+N_{TAoffset}+N_{TAoffset2})*T_c$$

where $N_{TA}$, $N_{TAoffset}$, and $T_c$, are as discussed above. The value of $N_{TAoffset2}$ may be adjusted to allow for further timing adjustments which may be beneficial in some cases. In some cases, such a second timing advance offset may be beneficial when relatively large RTTs are present in a wireless backhaul link, which may present multiplexing issues for some initial random access channel (RACH) transmissions. In such cases, due to relatively large distances that may be present in backhaul links, larger RTTs and thus TA values are present. However, in initial RACH transmissions, the value of the timing advance is zero, and RACH preambles are provided with cyclic prefixes that are large in order to accommodate timing variances.

By providing a second timing advance offset, the second wireless device 305 may adjust the second timing advance to account for larger backhaul link distances and that may be used when transmitting a RACH transmission. Thus, the cyclic prefix for RACH transmissions may continue to be used. In such cases, the extra TA offset provided by the second timing advance offset ($N_{TAoffset2}$) to IAB nodes that can be applied for RACH transmissions. In some cases, the second timing advance offset indication may be provided in a remaining minimum system information (RMSI) transmission, another system information (OSI) transmission, may be preconfigured, may be indicated by another node (e.g., another base station in a non-stand-alone (NSA) deployment), or combinations thereof. In some cases, the second wireless device 305 may set the second timing advance offset based on the network layout and minimum inter-site distance between nodes. In some cases, the second timing advance offset may be a cell-specific offset or a network-wide offset. In other cases, the second timing advance offset may account for timing adjustments associated with child and parent nodes in an IAB network. An example of such adjustments is discussed with respect to FIG. 4. Because the devices 305 and 315 may utilize the two timing advance offsets, the access nodes may maintain synchronization, which may increase signal and communication throughput in a wireless network (e.g., wireless communications system 100). For example, a relay node may not have to transmit a new TA command to each individual child node when changing an uplink or downlink timing reference of its children. Accordingly, communication resources for both the relay nodes and the child nodes may be conserved or used for other functionality, which may serve to increase the communication throughput in the network.

Figure 4:
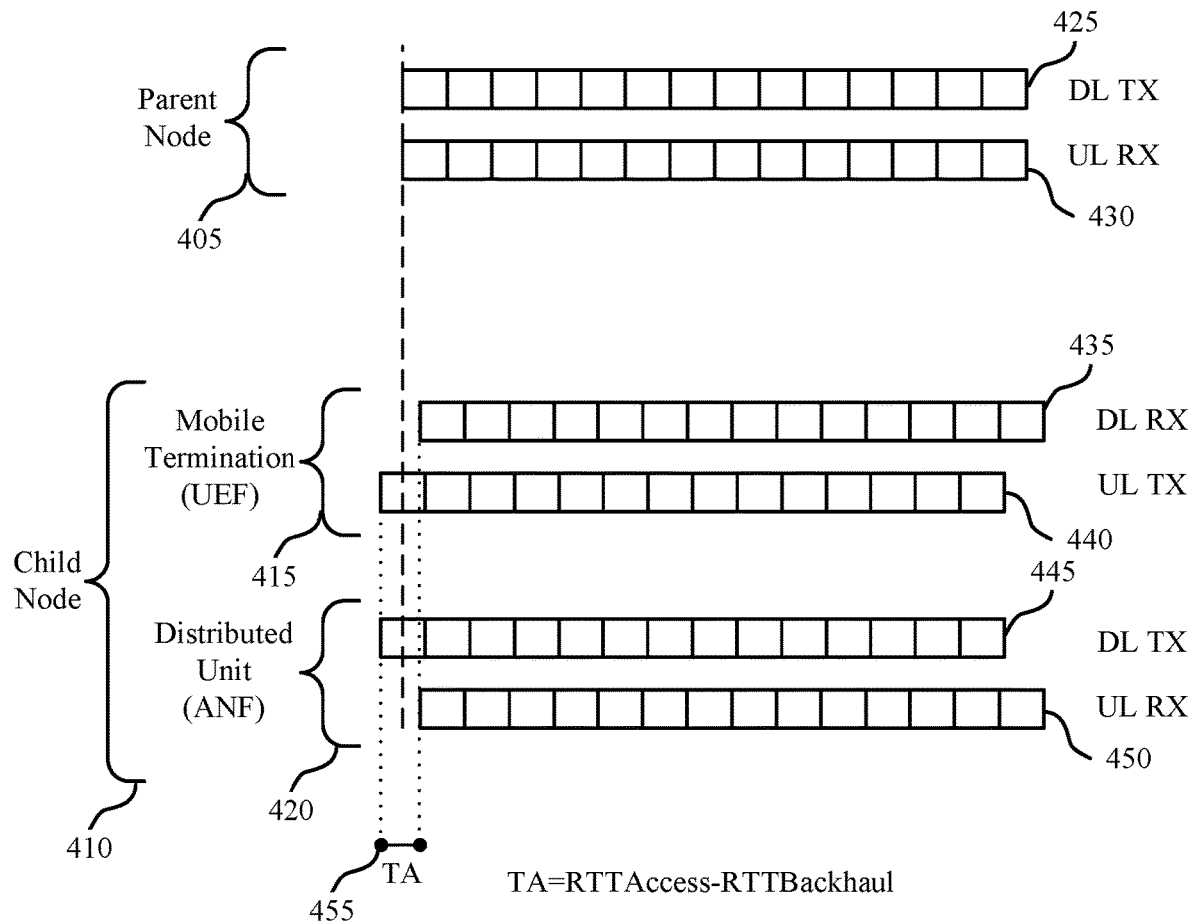
FIG. 4 illustrates an example of a parent and child node timing in accordance with aspects of the present disclosure.

FIG. 4 illustrates an example of parent and child node timing 400 in accordance with aspects of the present disclosure. In some examples, parent and child node timing 400 may implement aspects of wireless communication system 100 or IAB network 200. In this example, a parent node 405 may have an associated child node 410. Further, the child node 410 may have a mobile termination 415, such as a UEF, that manages communications with the parent node 405, and a distributed unit (DU) 420, such as an ANF, that manages communications with one or more other nodes or UEs. In this example, the parent node 405 has downlink reception timing 425 and uplink transmission timing 430 that are time aligned. The mobile termination 415 in this example has downlink reception timing 435 this is time aligned with uplink reception timing 450 of the DU 420, and has uplink transmission timing 440 that is time aligned with downlink transmission timing 445 of the DU 420.

Thus, in such an example, a TA 455 of the child node may thus have an additional value that corresponds to the difference between downlink reception timing 435 and uplink transmission timing 440. Rather than indicating such a value in every TA command, the second timing advance offset may be used to signal this value. In some cases, a cell that includes parent node 405 and child node 410 may adopt a timing alignment scheme (e.g., UL/DL or over multi-hop), in which the uplink TA 455 comprises a fixed value irrespective of a UE/MT's RTT, and an indication of such value in each and every TA command may similarly be avoided through setting of the second TA offset. In some cases, such a second timing advance offset may be cell-specific, UE/MT-specific, specific to a group of UE/MTs, or beam-specific. In some cases the indication of the second TA offset may be unicast (e.g., when UE-specific), broadcast or multicast. In some cases, the indication may be transmitted via be via RMSPOSI, a group-common physical downlink control channel (PDCCH) transmission, a physical downlink shared channel (PDSCH) transmission (e.g., a MAC CE), RRC signaling, backhaul signaling, preconfigured, indicated by another node (e.g., in NSA), or combinations thereof. In some cases, the second TA offset may be set to the RTT of an access link minus a RTT of the backhaul link.

In some other cases, a cell (e.g., a relay in IAB) may have to change its uplink and/or downlink timing reference of its children (e.g., as a result of change in the backhaul network, such as when a child node receives a new TA from its parent node). In such cases, sending a new TA command to each individual child node may waste resources, and the second timing advance offset may be adjusted and signaled to child nodes, UEs, or both. Signaling of the second timing advance offset in such cases may be performed as discussed above.

In some cases, two or more different values of a second timing advance offset may be transmitted. In such cases, a priority order may be established to determine which value is to be used by a child node or UE. In some cases, a priority order may be Unicast>multi-cast>broadcast. Additionally or alternatively, a priority order may be MAC-CE>RRC>BH signaling>group-common PDCCH>RMSI/OSI. In further cases, priority may be dependent on the time of indication, such that a new group-common PDCCH may override a previous MAC CE, for example.

Figure 5:
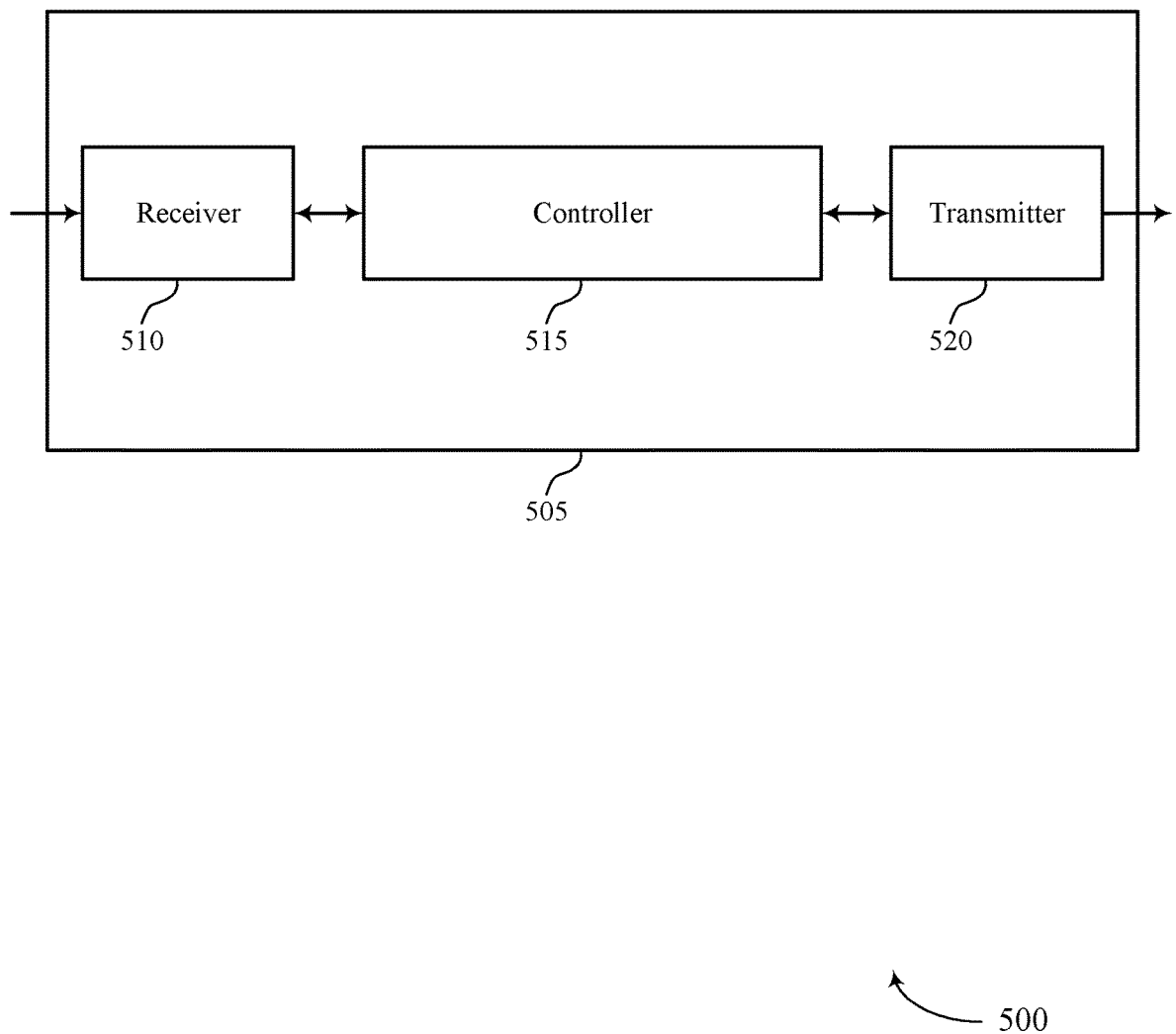
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a device as described herein. The device 505 may include a receiver 510, a controller 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to timing offset techniques in wireless communications, etc.). Information may be passed on to other components of the device 505. The receiver 510 may be an example of aspects of the transceiver 820 described with reference to FIG. 8. The receiver 510 may utilize a single antenna or a set of antennas.

In some cases, the device 505 may be a first wireless device, and the controller 515 may identify a first timing advance offset for communications with a second wireless device, where the first timing advance offset is a fixed offset that is based on a frequency range and a duplexing configuration for communications between the first wireless device and the second wireless device, determine a second timing advance offset, the second timing advance offset being adjustable, and communicate based on the first timing advance offset and the second timing advance offset.

In some cases, the device 505 may be a second wireless device, and the controller 515 may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicate based on the first timing advance offset and the second timing advance offset. The controller 515 may be an example of aspects of the controller 810 described herein.

The controller 515, or its sub-components, may be implemented in hardware, code (e.g., software or firmware) executed by a processor, or any combination thereof. If implemented in code executed by a processor, the functions of the controller 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The controller 515, or its sub-components, may be physically located at various positions, including being distributed such that portions of functions are implemented at different physical locations by one or more physical components. In some examples, the controller 515, or its sub-components, may be a separate and distinct component in accordance with various aspects of the present disclosure. In some examples, the controller 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
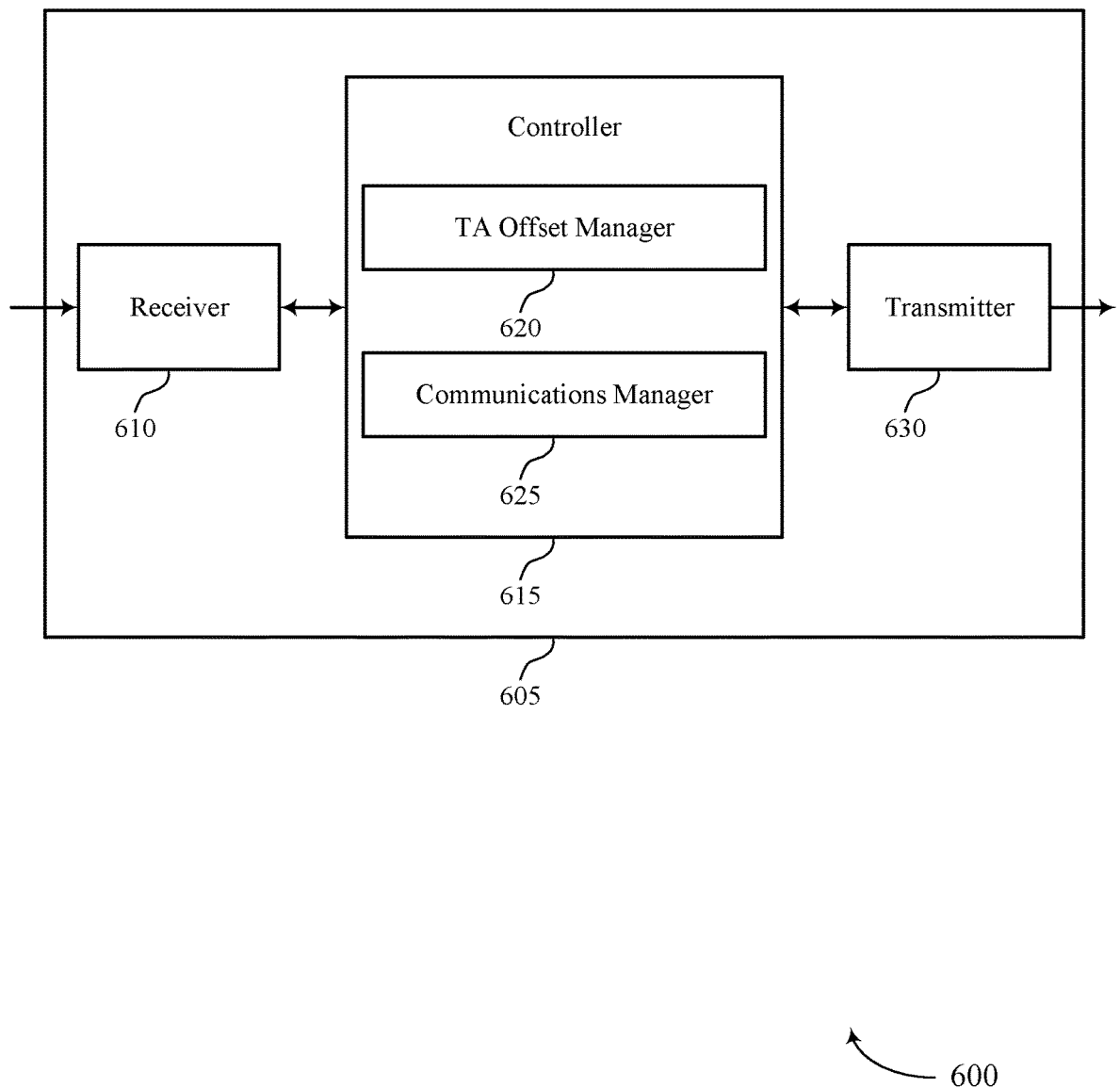

FIG. 6 shows a block diagram 600 of a device 605 in accordance with aspects of the present disclosure. The device 605 may be an example of aspects of a device 505, a base station 105, or a UE 115 as described herein. The device 605 may include a receiver 610, a controller 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to timing offset techniques in wireless communications, etc.). Information may be passed on to other components of the device 605. The receiver 610 may be an example of aspects of the transceiver 820 described with reference to FIG. 8. The receiver 610 may utilize a single antenna or a set of antennas.

The controller 615 may be an example of aspects of the controller 515 as described herein. The controller 615 may include a TA offset manager 620 and a communications manager 625. The controller 615 may be an example of aspects of the controller 810 described herein.

The TA offset manager 620, when part of a first wireless device, may identify a first timing advance offset for communications with a second wireless device, where the first timing advance offset is a fixed offset that is based on a frequency range and a duplexing configuration for communications between the first wireless device and the second wireless device and determine a second timing advance offset, the second timing advance offset being adjustable. The communications manager 625 in such cases may communicate based on the first timing advance offset and the second timing advance offset.

The TA offset manager 620, when part of a second wireless device, may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. The communications manager 625 in such cases may communicate based on the first timing advance offset and the second timing advance offset.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
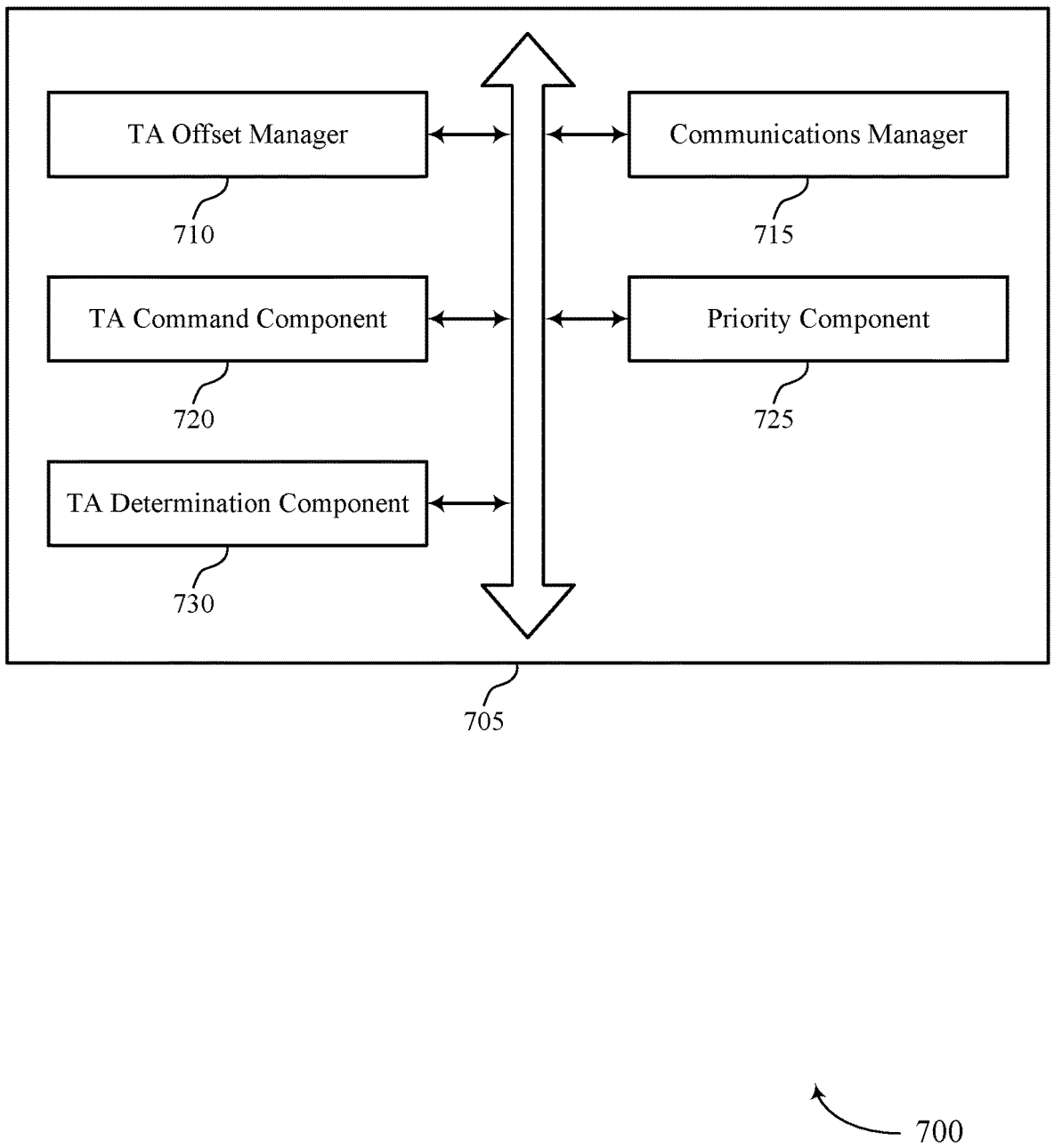
FIG. 7 shows a block diagram of a controller in accordance with aspects of the present disclosure.

FIG. 7 shows a block diagram 700 of a controller 705 in accordance with aspects of the present disclosure. The controller 705 may be an example of aspects of a controller 515, a controller 615, or a controller 810 described herein. The controller 705 may include a TA offset manager 710, a communications manager 715, a TA command component 720, a priority component 725, and a TA determination component 730. Each of these modules may communicate, directly or indirectly, with one another (e.g., via one or more buses).

The TA offset manager 710, when part of a first wireless device, may identify a first timing advance offset for communications with a second wireless device, where the first timing advance offset is a fixed offset that is based on a frequency range and a duplexing configuration for communications between the first wireless device and the second wireless device. In some examples, the TA offset manager 710 may determine a second timing advance offset, the second timing advance offset being adjustable.

In some examples, the TA offset manager 710, when part of a first wireless device, may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. In some examples, the TA offset manager 710 may receive an updated second timing advance offset from the second wireless device, where the updated second timing advance is based on a change in the timing advance between a relay node and the parent node in the IAB network. In some examples, the TA offset manager 710 may transmit the second timing advance offset to the first wireless device. In some examples, the TA offset manager 710 may receive a change in the timing advance from the parent node. In some examples, the TA offset manager 710 may transmit an updated second timing advance offset to the first wireless device responsive to the change in the timing advance received from the parent node. In some cases, the determining the second timing advance offset includes receiving the second timing advance value from the second wireless device or from a different wireless device.

In some cases, the second wireless device and the first wireless device are nodes in an integrated access and backhaul (IAB) network, and where the second timing advance offset is based on distance between relay nodes in the IAB network. In some cases, the second timing advance offset is a cell-specific value associated with the second wireless device. In some cases, the second timing advance offset is a network-wide value that applies to multiple nodes across a wireless network. In some cases, the second timing advance offset is applied to uplink transmissions from the first wireless device to the second wireless device irrespective of a propagation delay of transmissions between the first wireless device and the second wireless device. In some cases, the second wireless device is a relay node in an IAB network, and where the second timing advance offset indicates a timing difference between receive timing and transmission timing at the relay node. In some cases, the second timing advance offset is UE specific, cell-specific, specific to a group of UEs, or specific to a directional transmission beam of the base station. In some cases, the second wireless device is a relay node in an IAB network, and where the second timing advance offset is based on a timing advance between the relay node and a parent node in the IAB network.

The communications manager 715 may communicate with the first or second wireless device based on the first timing advance offset and the second timing advance offset. In some examples, the communications manager 715 when part of a first wireless device may transmit a shared channel transmission to the second wireless device based on the first timing advance offset, the second timing advance offset, and the timing advance value. In some examples, the communications manager 715 when part of a second wireless device may receive a shared channel transmission from the first wireless device that is based on the first timing advance offset, the second timing advance offset, and the timing advance value.

The TA command component 720 may receive a timing advance command from the second wireless device responsive to the RACH transmission, the timing advance command including a timing advance value that is based on a propagation delay for transmissions between the first wireless device and the second wireless device.

The priority component 725 may receive a second value for the second timing advance offset. In some examples, the priority component 725 may determine, based on a priority order, which of the first value or the second value is to be used for the communication with the second wireless device. In some examples, the priority component 725 may determine a second value for the second timing advance offset, and where a priority order indicates which of the first value or the second value is to be used for the uplink transmission. In some cases, the priority order is based on one or more of a type of signaling used to indicate the first value and the second value, or a time order of receiving the first value and the second value. In some cases, the type of signaling used to indicate the first value and the second value includes unicast signaling, multicast signaling, or broadcast signaling, and where second timing offset values received via unicast signaling have priority over values received via multicast signaling or broadcast signaling, and where second timing offset values received via multicast signaling have priority over values received via broadcast signaling. In some cases, the type of signaling used to indicate the first value and the second value includes medium access control (MAC) signaling, RRC signaling, backhaul signaling, group common PDCCH signaling, remaining minimum system information (RMSI) signaling, or other system information (OSI) signaling.

The TA determination component 730 may determine a timing advance value for the first wireless device, the timing advance value based on a propagation delay for transmissions between the first wireless device and the second wireless device. In some examples, the TA determination component 730 may transmit a timing advance command to the first wireless device responsive to determining the timing advance value, the timing advance command including the timing advance value.

Figure 8:
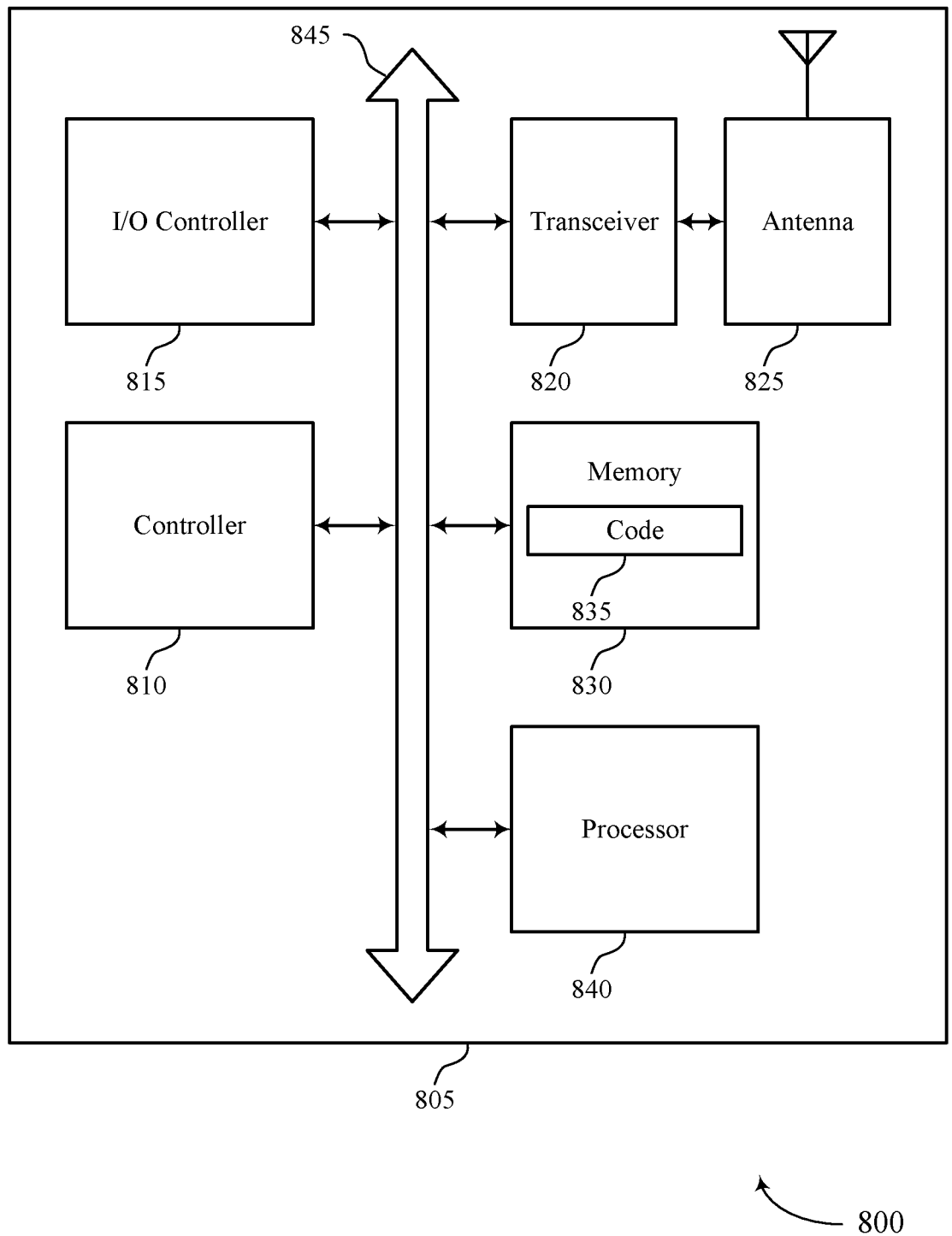
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a device as described herein. The device 805 may include components for bi-directional voice and data communications including components for transmitting and receiving communications, including a controller 810, an I/O controller 815, a transceiver 820, an antenna 825, memory 830, and a processor 840. These components may be in electronic communication via one or more buses (e.g., bus 845).

The controller 810 may identify, at a first wireless device a first timing advance offset for communications with a second wireless device, where the first timing advance offset is a fixed offset that is based on a frequency range and a duplexing configuration for communications between the first wireless device and the second wireless device, determine a second timing advance offset, the second timing advance offset being adjustable, and communicate based on the first timing advance offset and the second timing advance offset. The controller 810, when part of a second wireless device, may also determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device and communicate based on the first timing advance offset and the second timing advance offset.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting timing offset techniques in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
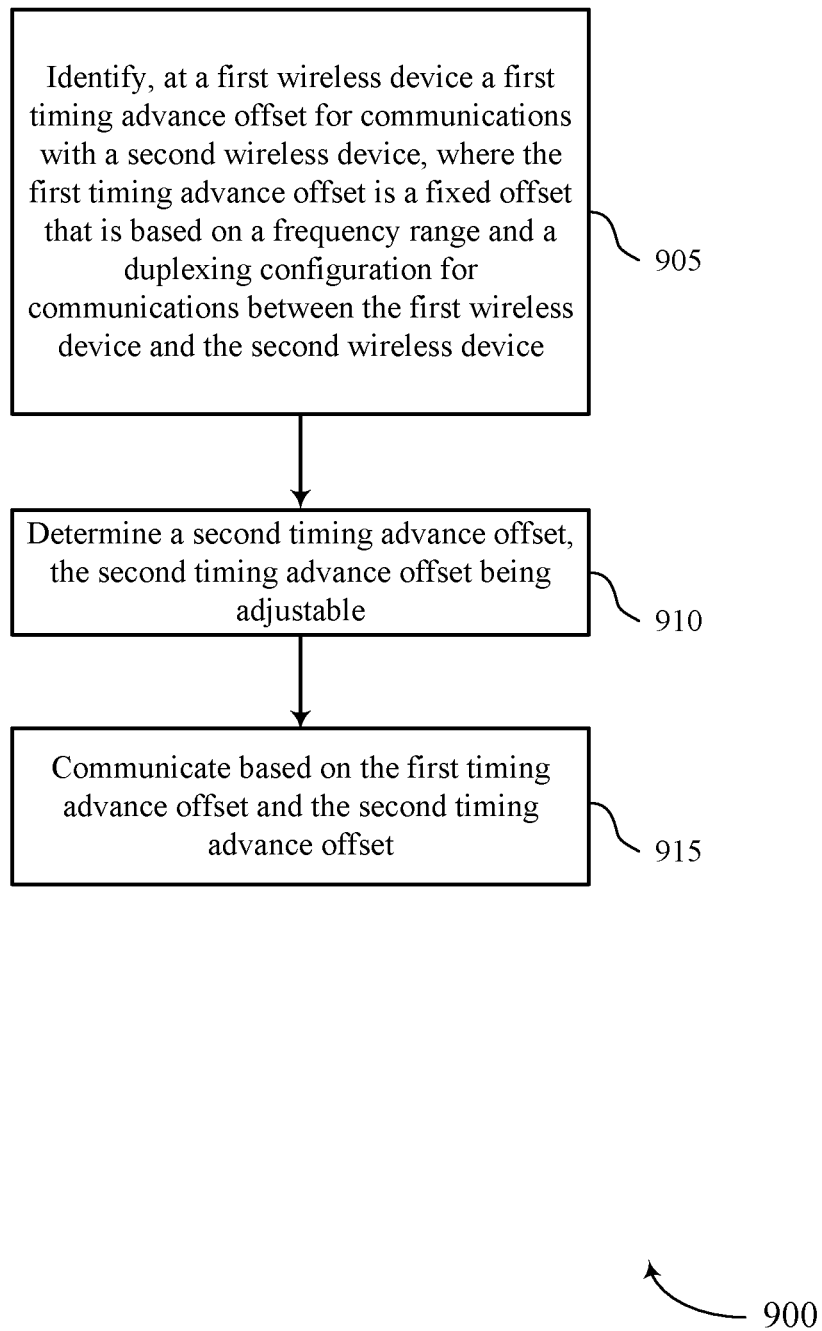
FIGS. 9 through 15 show flowcharts illustrating methods in accordance with aspects of the present disclosure.

FIG. 9 shows a flowchart illustrating a method 900 wireless communications in accordance with aspects of the present disclosure. The operations of method 900 may be implemented by a device or its components as described herein. For example, the operations of method 900 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may identify, at a first wireless device a first timing advance offset for communications with a second wireless device, where the first timing advance offset is a fixed offset that is based on a frequency range and a duplexing configuration for communications between the first wireless device and the second wireless device. The operations of 905 may be performed according to the methods described herein. In some examples, aspects of the operations of 905 may be performed by a TA offset manager as described with reference to FIGS. 5 through 8.

At 910, the device may determine a second timing advance offset, the second timing advance offset being adjustable. The operations of 910 may be performed according to the methods described herein. In some examples, aspects of the operations of 910 may be performed by a TA offset manager as described with reference to FIGS. 5 through 8.

At 915, the device may communicate based on the first timing advance offset and the second timing advance offset. The operations of 915 may be performed according to the methods described herein. In some examples, aspects of the operations of 915 may be performed by a communications manager as described with reference to FIGS. 5 through 8.

Figure 10:
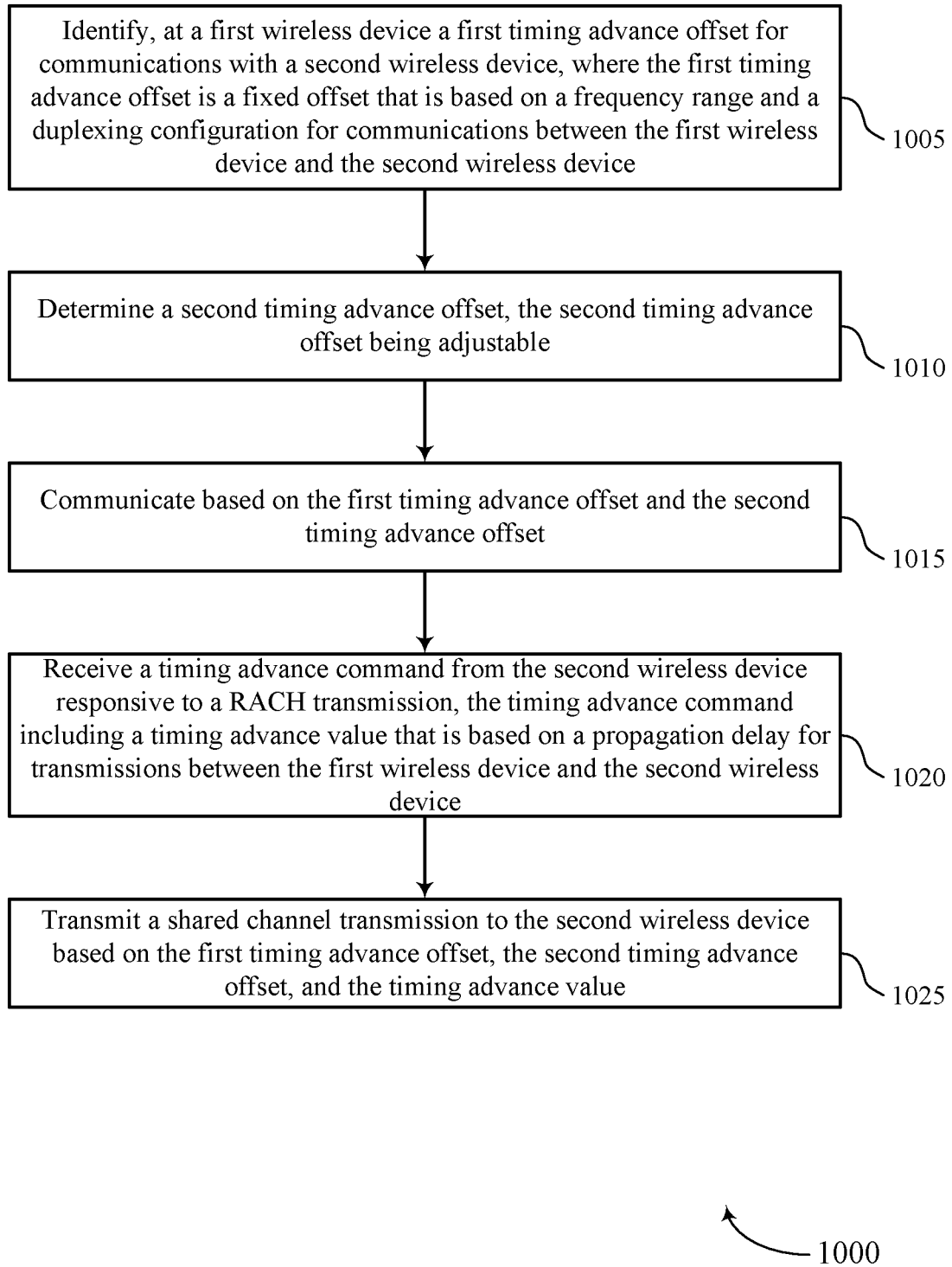

FIG. 10 shows a flowchart illustrating a method 1000 in accordance with aspects of the present disclosure. The operations of method 1000 may be implemented by a device or its components as described herein. For example, the operations of method 1000 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may identify, at a first wireless device a first timing advance offset for communications with a second wireless device, where the first timing advance offset is a fixed offset that is based on a frequency range and a duplexing configuration for communications between the first wireless device and the second wireless device. The operations of 1005 may be performed according to the methods described herein. In some examples, aspects of the operations of 1005 may be performed by a TA offset manager as described with reference to FIGS. 5 through 8.

At 1010, the device may determine a second timing advance offset, the second timing advance offset being adjustable. The operations of 1010 may be performed according to the methods described herein. In some examples, aspects of the operations of 1010 may be performed by a TA offset manager as described with reference to FIGS. 5 through 8.

At 1015, the device may communicate based on the first timing advance offset and the second timing advance offset. The operations of 1015 may be performed according to the methods described herein. In some examples, aspects of the operations of 1015 may be performed by a communications manager as described with reference to FIGS. 5 through 8.

At 1020, the device may receive a timing advance command from the second wireless device responsive to the RACH transmission, the timing advance command including a timing advance value that is based on a propagation delay for transmissions between the first wireless device and the second wireless device. The operations of 1020 may be performed according to the methods described herein. In some examples, aspects of the operations of 1020 may be performed by a TA command component as described with reference to FIGS. 5 through 8.

At 1025, the device may transmit a shared channel transmission to the second wireless device based on the first timing advance offset, the second timing advance offset, and the timing advance value. The operations of 1025 may be performed according to the methods described herein. In some examples, aspects of the operations of 1025 may be performed by a communications manager as described with reference to FIGS. 5 through 8.

Figure 11:
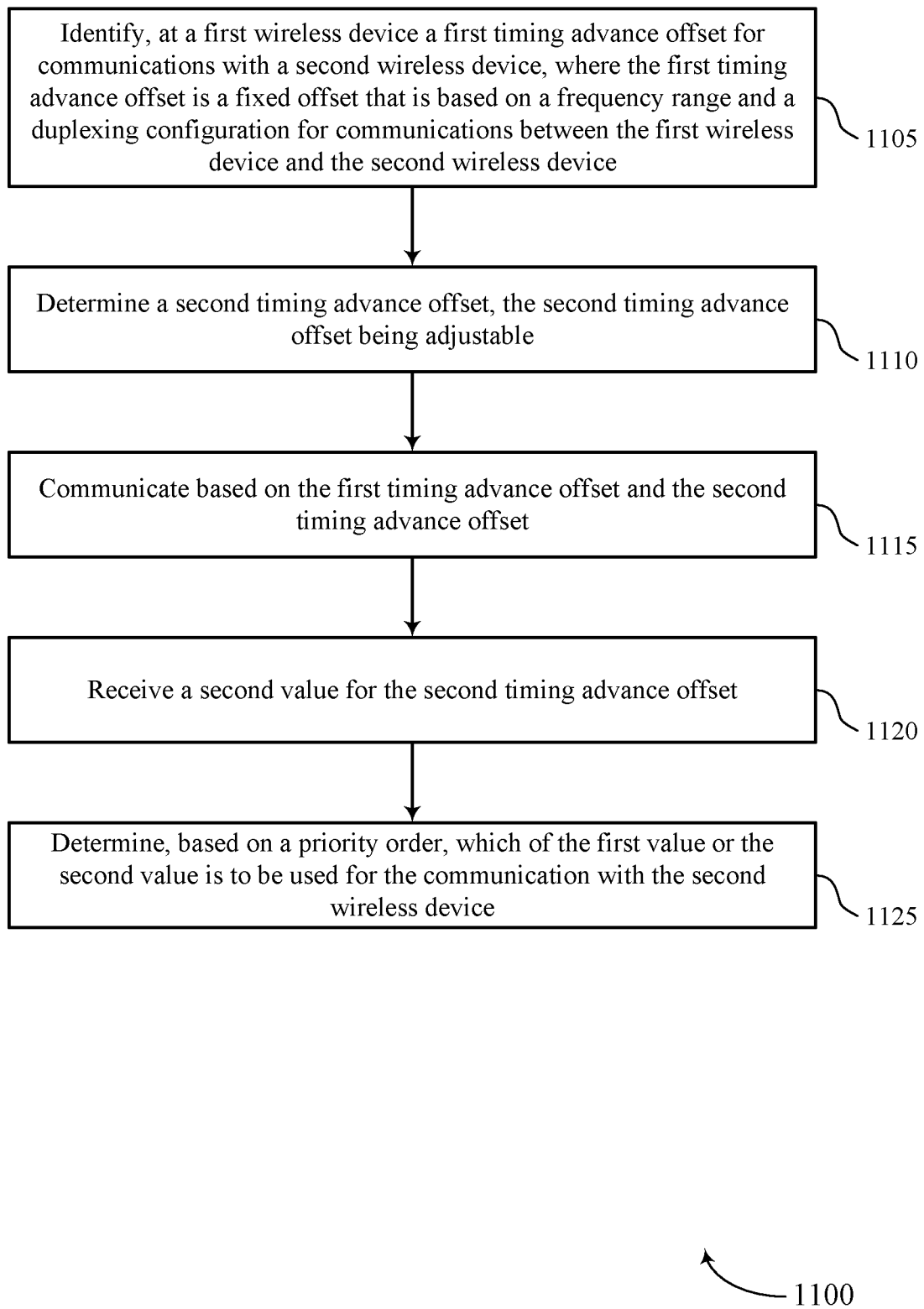

FIG. 11 shows a flowchart illustrating a method 1100 in accordance with aspects of the present disclosure. The operations of method 1100 may be implemented by a device or its components as described herein. For example, the operations of method 1100 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1105, the device may identify, at a first wireless device a first timing advance offset for communications with a second wireless device, where the first timing advance offset is a fixed offset that is based on a frequency range and a duplexing configuration for communications between the first wireless device and the second wireless device. The operations of 1105 may be performed according to the methods described herein. In some examples, aspects of the operations of 1105 may be performed by a TA offset manager as described with reference to FIGS. 5 through 8.

At 1110, the device may determine a second timing advance offset, the second timing advance offset being adjustable. The operations of 1110 may be performed according to the methods described herein. In some examples, aspects of the operations of 1110 may be performed by a TA offset manager as described with reference to FIGS. 5 through 8.

At 1115, the device may communicate based on the first timing advance offset and the second timing advance offset. The operations of 1115 may be performed according to the methods described herein. In some examples, aspects of the operations of 1115 may be performed by a communications manager as described with reference to FIGS. 5 through 8.

At 1120, the device may receive a second value for the second timing advance offset. The operations of 1120 may be performed according to the methods described herein. In some examples, aspects of the operations of 1120 may be performed by a priority component as described with reference to FIGS. 5 through 8.

At 1125, the device may determine, based on a priority order, which of the first value or the second value is to be used for the communication. The operations of 1125 may be performed according to the methods described herein. In some examples, aspects of the operations of 1125 may be performed by a priority component as described with reference to FIGS. 5 through 8. In some cases, the priority order is based on one or more of a type of signaling used to indicate the first value and the second value, or a time order of receiving the first value and the second value. In some cases, the type of signaling used to indicate the first value and the second value includes unicast signaling, multicast signaling, or broadcast signaling, and where second timing offset values received via unicast signaling have priority over values received via multicast signaling or broadcast signaling, and where second timing offset values received via multicast signaling have priority over values received via broadcast signaling. In some cases, the type of signaling used to indicate the first value and the second value includes medium access control (MAC) signaling, RRC signaling, backhaul signaling, group common PDCCH signaling, remaining minimum system information (RMSI) signaling, or other system information (OSI) signaling.

Figure 12:
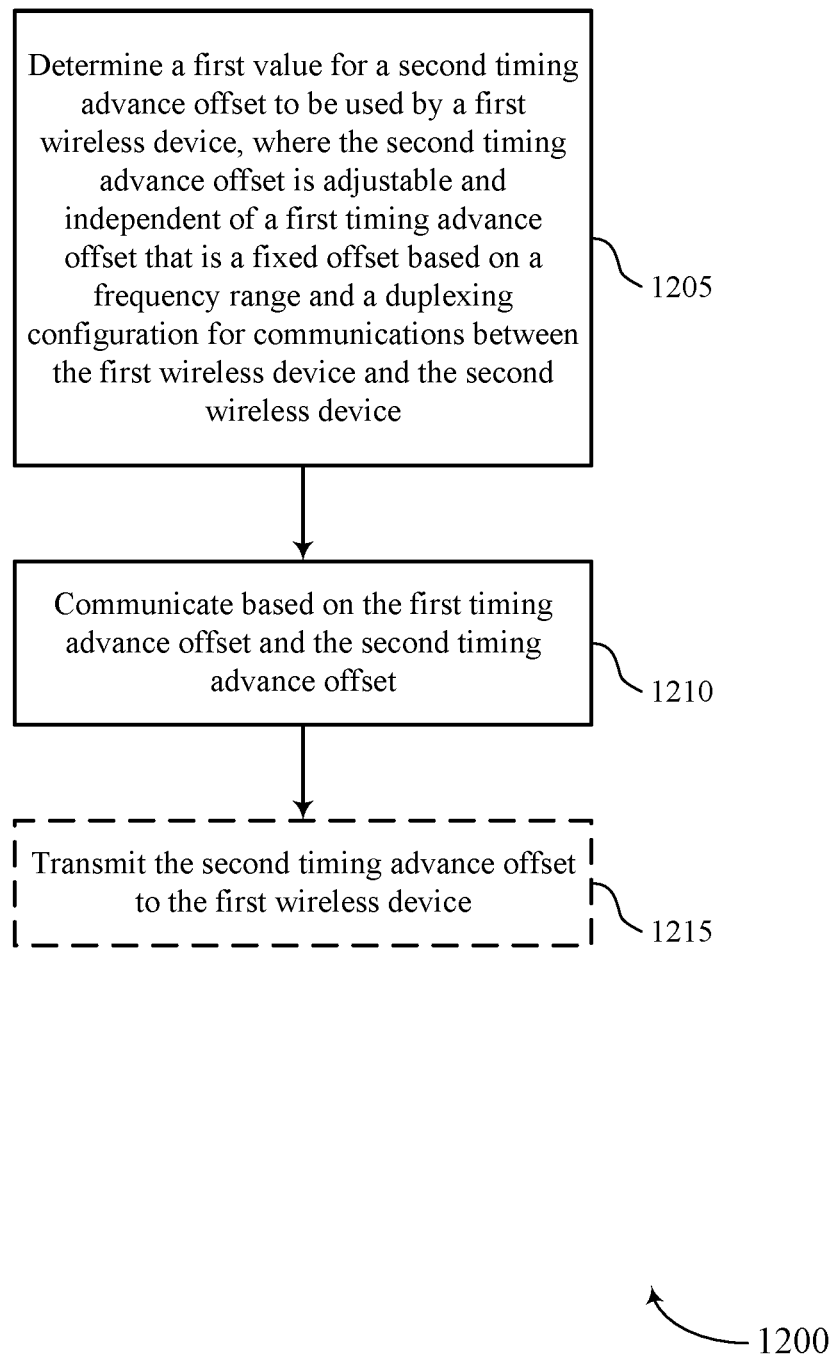

FIG. 12 shows a flowchart illustrating a method 1200 in accordance with aspects of the present disclosure. The operations of method 1200 may be implemented by a device or its components as described herein. For example, the operations of method 1200 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1205, the device may be a second wireless device and may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. The operations of 1205 may be performed according to the methods described herein. In some examples, aspects of the operations of 1205 may be performed by a TA offset manager as described with reference to FIGS. 5 through 8.

At 1210, the device may communicate based on the first timing advance offset and the second timing advance offset. The operations of 1210 may be performed according to the methods described herein. In some examples, aspects of the operations of 1210 may be performed by a communications manager as described with reference to FIGS. 5 through 8.

At 1215, the device may optionally transmit the second timing advance offset to the first wireless device. The operations of 1215 may be performed according to the methods described herein. In some examples, aspects of the operations of 1215 may be performed by a TA offset manager as described with reference to FIGS. 5 through 8.

Figure 13:
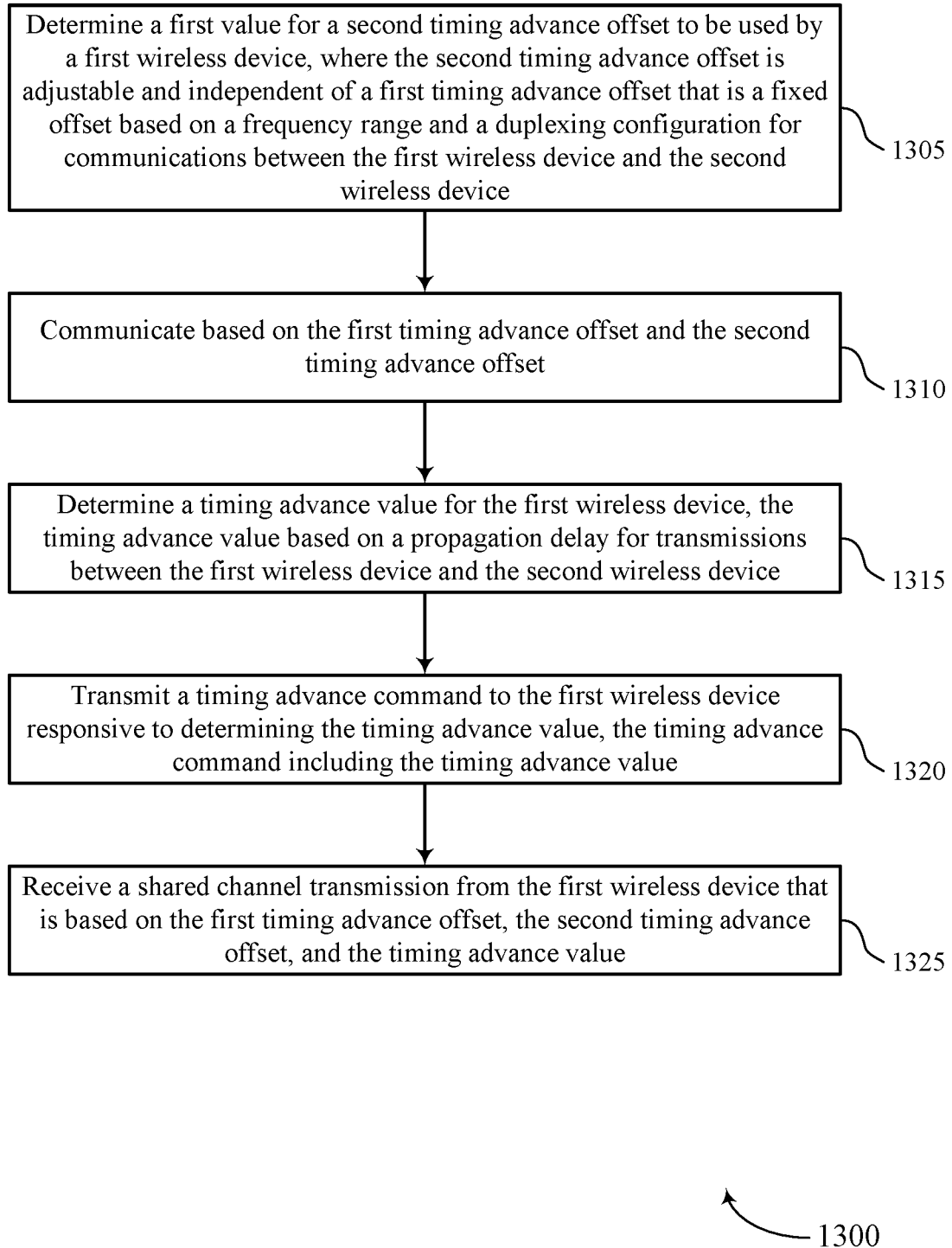

FIG. 13 shows a flowchart illustrating a method 1300 in accordance with aspects of the present disclosure. The operations of method 1300 may be implemented by a device or its components as described herein. For example, the operations of method 1300 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1305, the device may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. The operations of 1305 may be performed according to the methods described herein. In some examples, aspects of the operations of 1305 may be performed by a TA offset manager as described with reference to FIGS. 5 through 8.

At 1310, the device may communicate based on the first timing advance offset and the second timing advance offset. The operations of 1310 may be performed according to the methods described herein. In some examples, aspects of the operations of 1310 may be performed by a communications manager as described with reference to FIGS. 5 through 8.

At 1315, the device may determine a timing advance value for the first wireless device, the timing advance value based on a propagation delay for transmissions between the first wireless device and the second wireless device. The operations of 1315 may be performed according to the methods described herein. In some examples, aspects of the operations of 1315 may be performed by a TA determination component as described with reference to FIGS. 5 through 8.

At 1320, the device may transmit a timing advance command to the first wireless device responsive to determining the timing advance value, the timing advance command including the timing advance value. The operations of 1320 may be performed according to the methods described herein. In some examples, aspects of the operations of 1320 may be performed by a TA determination component as described with reference to FIGS. 5 through 8.

At 1325, the device may receive a shared channel transmission from the first wireless device that is based on the first timing advance offset, the second timing advance offset, and the timing advance value. The operations of 1325 may be performed according to the methods described herein. In some examples, aspects of the operations of 1325 may be performed by a communications manager as described with reference to FIGS. 5 through 8.

Figure 14:
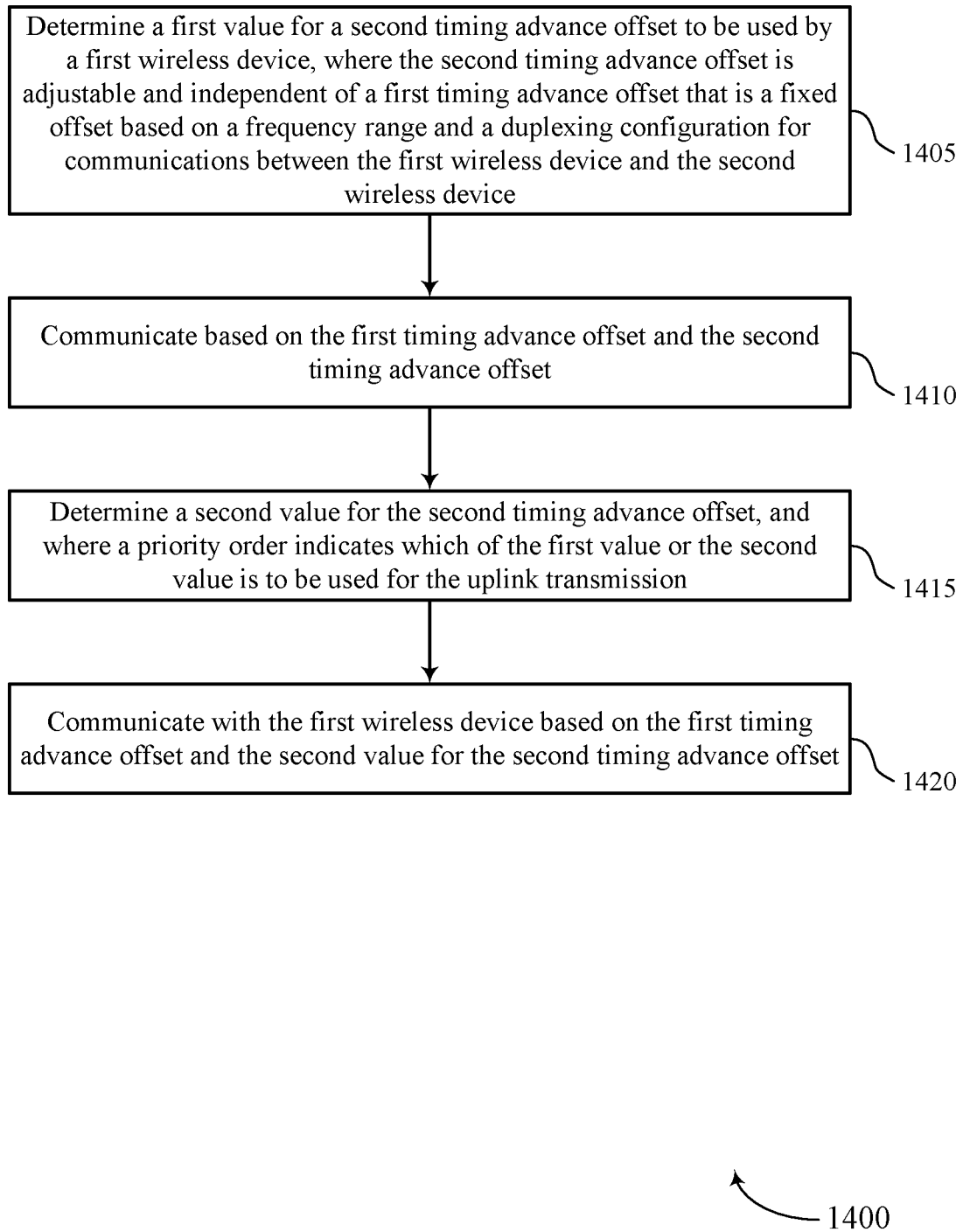

FIG. 14 shows a flowchart illustrating a method 1400 in accordance with aspects of the present disclosure. The operations of method 1400 may be implemented by a device or its components as described herein. For example, the operations of method 1400 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1405, the device may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. The operations of 1405 may be performed according to the methods described herein. In some examples, aspects of the operations of 1405 may be performed by a TA offset manager as described with reference to FIGS. 5 through 8.

At 1410, the device may communicate based on the first timing advance offset and the second timing advance offset. The operations of 1410 may be performed according to the methods described herein. In some examples, aspects of the operations of 1410 may be performed by a communications manager as described with reference to FIGS. 5 through 8.

At 1415, the device may determine a second value for the second timing advance offset, and where a priority order indicates which of the first value or the second value is to be used for the uplink transmission. The operations of 1415 may be performed according to the methods described herein. In some examples, aspects of the operations of 1415 may be performed by a priority component as described with reference to FIGS. 5 through 8.

At 1420, the device may communicate based on the first timing advance offset and the second value for the second timing advance offset. The operations of 1420 may be performed according to the methods described herein. In some examples, aspects of the operations of 1420 may be performed by a priority component as described with reference to FIGS. 5 through 8. In some cases, the priority order is based on one or more of a type of signaling used to indicate the first value and the second value, or a time order of receiving the first value and the second value. In some cases, the type of signaling used to indicate the first value and the second value includes unicast signaling, multicast signaling, or broadcast signaling, and where second timing offset values received via unicast signaling have priority over values received via multicast signaling or broadcast signaling, and where second timing offset values received via multicast signaling have priority over values received via broadcast signaling. In some cases, the type of signaling used to indicate the first value and the second value includes medium access control (MAC) signaling, RRC signaling, backhaul signaling, group common PDCCH signaling, remaining minimum system information (RMSI) signaling, or other system information (OSI) signaling.

Figure 15:
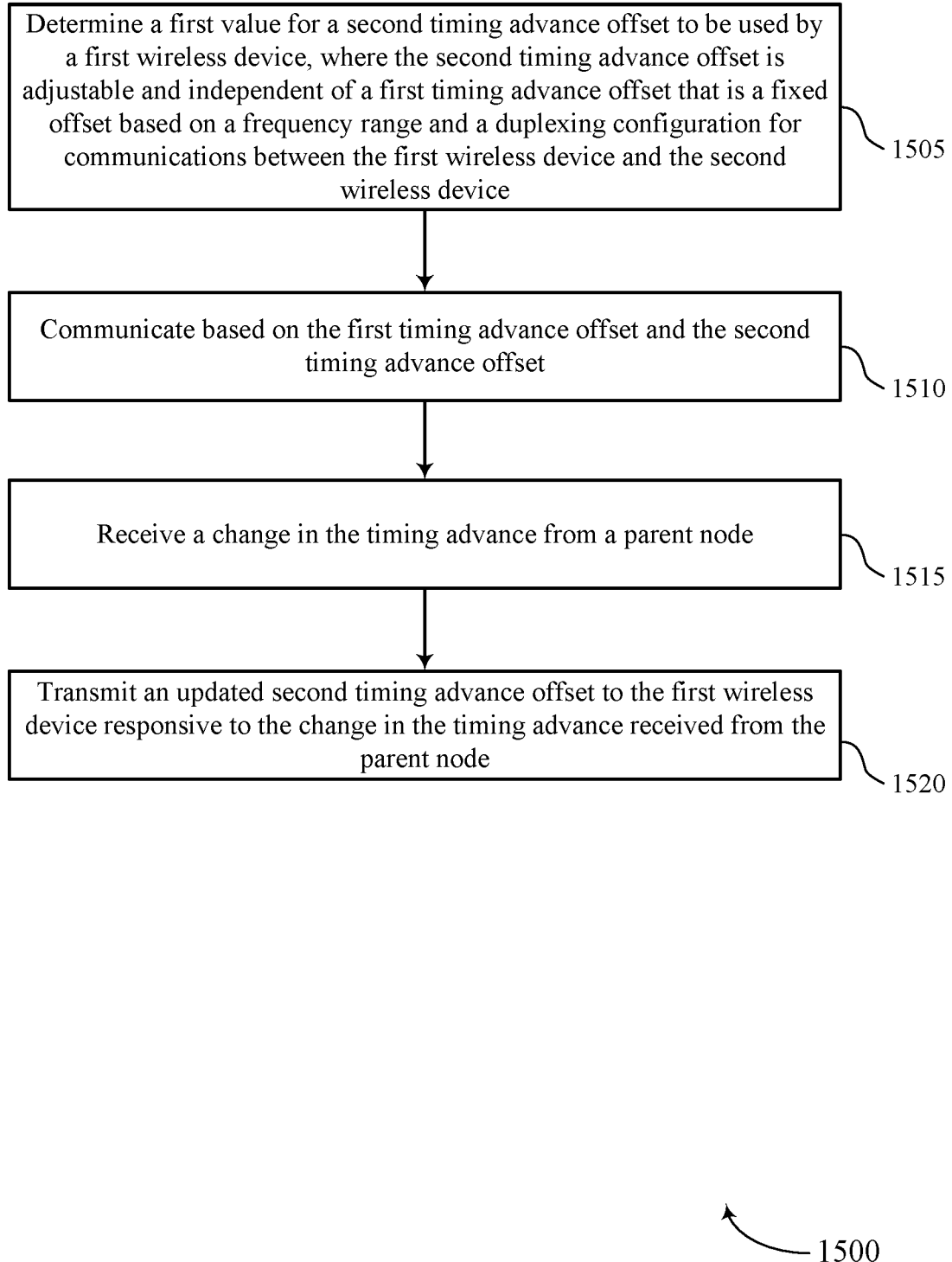

FIG. 15 shows a flowchart illustrating a method 1500 in accordance with aspects of the present disclosure. The operations of method 1500 may be implemented by a device or its components as described herein. For example, the operations of method 1500 may be performed by a controller as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1505, the device may determine a first value for a second timing advance offset to be used by a first wireless device, where the second timing advance offset is adjustable and independent of a first timing advance offset that is a fixed offset based on a frequency range and a duplexing configuration for communications between the first wireless device and the second wireless device. The operations of 1505 may be performed according to the methods described herein. In some examples, aspects of the operations of 1505 may be performed by a TA offset manager as described with reference to FIGS. 5 through 8.

At 1510, the device may communicate based on the first timing advance offset and the second timing advance offset. The operations of 1510 may be performed according to the methods described herein. In some examples, aspects of the operations of 1510 may be performed by a communications manager as described with reference to FIGS. 5 through 8. In some cases, the second wireless device is a relay node in an integrated access and backhaul (IAB) network, and where the second timing advance offset is based on a timing advance between the second wireless device and a parent node in the IAB network.

At 1515, the device may receive a change in the timing advance from the parent node. The operations of 1515 may be performed according to the methods described herein. In some examples, aspects of the operations of 1515 may be performed by a TA offset manager as described with reference to FIGS. 5 through 8.

At 1520, the device may transmit an updated second timing advance offset to the first wireless device responsive to the change in the timing advance received from the parent node. The operations of 1520 may be performed according to the methods described herein. In some examples, aspects of the operations of 1520 may be performed by a TA offset manager as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, at a first wireless device, a timing advance value and a first timing advance offset for communications with a second wireless device, wherein the first timing advance offset is a fixed offset that is based at least in part on a frequency range for the communications between the first wireless device and the second wireless device, and wherein the first timing advance offset is associated with the timing advance value;
    determining a second timing advance offset, the second timing advance offset being adjustable, wherein the second timing advance offset is associated with the timing advance value; and
    transmitting an uplink transmission in accordance with an uplink timing adjustment value, the uplink timing adjustment value being a function of a sampling period duration, the timing advance value, the first timing advance offset, and the second timing advance offset.

2. The method of claim 1, wherein the transmitting comprises communicating with the second wireless device by transmitting an uplink random access channel (RACH) transmission, and wherein the method further comprises:
    receiving a timing advance command from the second wireless device responsive to the uplink RACH transmission, the timing advance command including the timing advance value that is based on a propagation delay for transmissions between the first wireless device and the second wireless device; and
    transmitting a shared channel transmission to the second wireless device based at least in part on the first timing advance offset, the second timing advance offset, and the timing advance value.

3. The method of claim 1, wherein the determining the second timing advance offset comprises receiving the second timing advance offset from the second wireless device or from a different wireless device.

4. The method of claim 1, wherein the determining the second timing advance offset comprises receiving a first value for the second timing advance offset, and wherein the method further comprises:
    receiving a second value for the second timing advance offset; and
    determining, based on a priority order, which of the first value or the second value is to be used for the transmitting the uplink transmission.

5. The method of claim 4, wherein the priority order is based at least in part on one or more of a type of signaling used to indicate the first value and the second value, or a time order of receiving the first value and the second value.

6. The method of claim 5, wherein the type of signaling used to indicate the first value and the second value comprises unicast signaling, multicast signaling, or broadcast signaling, and wherein second timing offset values received via unicast signaling have priority over values received via multicast signaling or broadcast signaling, and wherein second timing offset values received via multicast signaling have priority over values received via broadcast signaling.

7. The method of claim 5, wherein the type of signaling used to indicate the first value and the second value comprises medium access control (MAC) signaling, radio resource control (RRC) signaling, backhaul signaling, group common physical downlink control channel (PDCCH) signaling, remaining minimum system information (RMSI) signaling, or other system information (OSI) signaling.

8. The method of claim 1, wherein the second wireless device and the first wireless device are relay nodes in an integrated access and backhaul (IAB) network, and wherein the second timing advance offset is based at least in part on distance between the relay nodes in the IAB network.

9. The method of claim 1, wherein the second timing advance offset is a cell-specific value associated with the second wireless device.

10. The method of claim 1, wherein the second timing advance offset is a network-wide value that applies to multiple nodes across a wireless network.

11. The method of claim 1, wherein the second timing advance offset is applied to uplink transmissions from the first wireless device to the second wireless device irrespective of a propagation delay of transmissions between the first wireless device and the second wireless device.

12. The method of claim 11, wherein the second wireless device is a relay node in an integrated access and backhaul (IAB) network, and wherein the second timing advance offset indicates a timing difference between receive timing and transmission timing at the relay node.

13. The method of claim 1, wherein the second wireless device is a relay node in an integrated access and backhaul (IAB) network, and wherein the second timing advance offset is based on a timing advance between the relay node and a parent node in the IAB network.

14. The method of claim 13, further comprising:
    receiving an updated second timing advance offset from the second wireless device, wherein the updated second timing advance offset is based at least in part on a change in the timing advance between the relay node and the parent node in the IAB network.

15. The method of claim 1, wherein the uplink timing adjustment value is a product of the sampling period duration and a sum of the timing advance value, the first timing advance offset, and the second timing advance offset.

16. A method for wireless communication at a second wireless device, comprising:
   determining a first value for a second timing advance offset to be used by a first wireless device, wherein the second timing advance offset is adjustable and independent of a first timing advance offset that is a fixed offset based at least in part on a frequency range for communications between the first wireless device and the second wireless device, and wherein the first timing advance offset and the second timing advance offset are each associated with a timing advance value; and
   transmitting an uplink transmission in accordance with an uplink timing adjustment value, the uplink timing adjustment value being a function of a sampling period duration, the timing advance value, the first timing advance offset, and the second timing advance offset.

17. The method of claim 16, further comprising:
   transmitting the second timing advance offset to the first wireless device.

18. The method of claim 16, wherein transmitting the uplink transmission comprises communicating with the first wireless device by receiving an uplink random access channel (RACH) transmission, and wherein the method further comprises:
   determining the timing advance value for the first wireless device, the timing advance value based on a propagation delay for transmissions between the first wireless device and the second wireless device;
   transmitting a timing advance command to the first wireless device responsive to determining the timing advance value, the timing advance command including the timing advance value; and
   receiving a shared channel transmission from the first wireless device that is based at least in part on the first timing advance offset, the second timing advance offset, and the timing advance value.

19. The method of claim 16, further comprising:
   transmitting an indication of a second value for the second timing advance offset, and wherein a priority order indicates which of the first value or the second value is to be used for an uplink transmission.

20. The method of claim 19, wherein the priority order is based at least in part on one or more of a type of signaling used to indicate the first value and the second value, or a time order of receiving the first value and the second value.

21. The method of claim 20, wherein the type of signaling used to indicate the first value and the second value comprises unicast signaling, multicast signaling, or broadcast signaling, and wherein second timing offset values received via unicast signaling have priority over values received via multicast signaling or broadcast signaling, and wherein second timing offset values received via multicast signaling have priority over values received via broadcast signaling.

22. The method of claim 20, wherein the type of signaling used to indicate the first value and the second value comprises medium access control (MAC) signaling, radio resource control (RRC) signaling, backhaul signaling, group common physical downlink control channel (PDCCH) signaling, remaining minimum system information (RMSI) signaling, or other system information (OSI) signaling.

23. The method of claim 16, wherein the second wireless device and the first wireless device are nodes in an integrated access and backhaul (IAB) network, and wherein the second timing advance offset is based at least in part on distance between relay nodes in the IAB network.

24. The method of claim 16, wherein the second timing advance offset is a cell-specific value associated with the second wireless device or the second timing advance offset is a network-wide value that applies to multiple nodes across a wireless network.

25. The method of claim 16, wherein the second timing advance offset is applied to communications with the first wireless device irrespective of a propagation delay of transmissions between the first wireless device and the second wireless device.

26. The method of claim 25, wherein the second wireless device is a relay node in an integrated access and backhaul (IAB) network, and wherein the second timing advance offset indicates a timing difference between receive timing and transmission timing at the relay node.

27. The method of claim 16, wherein the second wireless device is a relay node in an integrated access and backhaul (IAB) network, and wherein the second timing advance offset is based on a timing advance between the second wireless device and a parent node in the IAB network.

28. The method of claim 27, further comprising:
   receiving a change in the timing advance from the parent node; and
   transmitting an updated second timing advance offset to the first wireless device responsive to the change in the timing advance received from the parent node.

29. A wireless device for wireless communication, comprising:
   one or more processors; and
   memory coupled to the one or more processors, the one or more processors configured individually or collectively to cause the wireless device to:
   identify, at a first wireless device, a timing advance value and a first timing advance offset for communications with a second wireless device, wherein the first timing advance offset is a fixed offset that is based at least in part on a frequency range for the communications between the first wireless device and the second wireless device, and wherein the first timing advance offset is associated with the timing advance value;
   determine a second timing advance offset, the second timing advance offset being adjustable, wherein the second timing advance offset is associated with the timing advance value; and
   transmit an uplink transmission in accordance with an uplink timing adjustment value, the uplink timing adjustment value being a function of a sampling period duration, the timing advance value, the first timing advance offset, and the second timing advance offset.

30. A second wireless device for wireless communication, comprising:
   one or more processors; and
   memory coupled to the one or more processors, the one or more processors configured individually or collectively to cause the second wireless device to:
   determine a first value for a second timing advance offset to be used by a first wireless device, wherein the second timing advance offset is adjustable and independent of a first timing advance offset that is a fixed offset based at least in part on a frequency range for communications between the first wireless device and the second wireless device, and wherein the first timing advance offset and the second timing advance offset are each associated with a timing advance value; and transmit an uplink transmission in accordance with an uplink timing adjustment value, the uplink timing adjustment value being a function of a sampling period duration, the timing advance value, the first timing advance offset, and the second timing advance offset.

* * * * *